US011351831B2

(12) United States Patent
Ohno et al.

(10) Patent No.: US 11,351,831 B2
(45) Date of Patent: Jun. 7, 2022

(54) ELECTRICALLY POWERED SUSPENSION SYSTEM

(71) Applicant: HONDA MOTOR CO., LTD., Tokyo (JP)

(72) Inventors: Satoshi Ohno, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 300 days.

(21) Appl. No.: 16/850,075

(22) Filed: Apr. 16, 2020

(65) Prior Publication Data

US 2020/0331316 A1 Oct. 22, 2020

(30) Foreign Application Priority Data

Apr. 16, 2019 (JP) ............................ JP2019-078130

(51) Int. Cl.
*B60G 17/0165* (2006.01)
*B60G 17/016* (2006.01)
(Continued)

(52) U.S. Cl.
CPC ......... *B60G 17/0165* (2013.01); *B60G 15/04* (2013.01); *B60G 17/0162* (2013.01);
(Continued)

(58) Field of Classification Search
CPC .......................... B60G 17/0165; B60G 15/04; B60G 17/0162; B60G 17/06
See application file for complete search history.

(56) References Cited

U.S. PATENT DOCUMENTS 5,028,073 A * 7/1991 Harms .................. B60G 13/14
280/5.514
5,497,324 A * 3/1996 Henry ............... B60G 17/0157
280/5.503

(Continued)

FOREIGN PATENT DOCUMENTS

JP 2008-035613 A 2/2008
JP 2011-189774 A 9/2011

(Continued)

OTHER PUBLICATIONS

Machine translation of JP2011189774 (Year: 2011).*

(Continued)

*Primary Examiner* — Paul N Dickson
*Assistant Examiner* — Kurtis Nielson
(74) *Attorney, Agent, or Firm* — Rankin, Hill & Clark LLP

(57) ABSTRACT

An electrically powered suspension system includes: an electromagnetic actuator; an information acquisition unit configured to acquire time-series information related to stroke position of the electromagnetic actuator, information on stroke velocity, and an amount of change in stroke of the electromagnetic actuator and information on a stroke direction based on the time-series information; a damping force calculation unit configured to calculate target damping force based on the information on the stroke velocity; and a drive control unit configured to control driving of the electromagnetic actuator using target driving force obtained based on the target damping force. The damping force calculation unit calculates equivalent friction compensation force based on the amount of change in the stroke and the information on the stroke direction, and corrects the target damping force based on the calculated equivalent friction compensation (Continued)

force. The equivalent friction compensation force has elastic force component and dynamic friction force component.

7 Claims, 14 Drawing Sheets

(51) Int. Cl.
*B60G 15/04* (2006.01)
*B60G 17/06* (2006.01)

(52) U.S. Cl.
CPC .......... *B60G 17/06* (2013.01); *B60G 2200/10* (2013.01); *B60G 2202/25* (2013.01); *B60G 2202/31* (2013.01); *B60G 2202/42* (2013.01); *B60G 2204/419* (2013.01); *B60G 2204/62* (2013.01); *B60G 2206/41* (2013.01); *B60G 2400/204* (2013.01); *B60G 2400/40* (2013.01); *B60G 2400/82* (2013.01); *B60G 2500/104* (2013.01); *B60G 2600/182* (2013.01); *B60G 2600/73* (2013.01); *B60G 2800/162* (2013.01)

(56) References Cited

U.S. PATENT DOCUMENTS 10,471,788 B2 11/2019 Ohno et al.
2015/0231942 A1* 8/2015 Trangbaek ............ F16F 15/022
267/195
2018/0154728 A1* 6/2018 Giovanardi ........ B60G 17/0182
2018/0297434 A1 10/2018 Ohno et al.
2018/0361814 A1 12/2018 Ohno et al.
2018/0361816 A1* 12/2018 Ohno ................. B60G 17/0165
2020/0386292 A1* 12/2020 Oblizajek ............... F16F 9/535
2021/0016620 A1* 1/2021 Gokhale ................ B60G 13/02
2021/0023904 A1* 1/2021 Kasuya ................ B60G 17/019

FOREIGN PATENT DOCUMENTS

JP 2011189774 A * 9/2011
JP 2014043199 A * 3/2014 ............. B60G 13/04
JP 2014210573 A * 11/2014
JP 2018-177050 A 11/2018
JP 2019-001369 A 1/2019
JP 2019-001370 A 1/2019

OTHER PUBLICATIONS

Office Action received in corresponding Japanese application No. 2019-078130 dated Nov. 10, 2020 with English translation (6 pages).

* cited by examiner

ELECTRICALLY POWERED SUSPENSION SYSTEM

CROSS-REFERENCE TO RELATED APPLICATION

This application claims the benefit of foreign priority to Japanese Patent Application No. 2019-078130, filed on Apr. 16, 2019, which is incorporated by reference in its entirety.

TECHNICAL FIELD

The present invention relates to an electrically powered suspension system including an electromagnetic actuator. The electromagnetic actuator is disposed in parallel with a spring member installed between a vehicle body and a wheel of a vehicle, and generates a driving force related to vibration damping of the vehicle.

BACKGROUND ART

An electrically powered suspension system including an electromagnetic actuator has conventionally been known. The electromagnetic actuator of this electrically powered suspension system is disposed in parallel with a spring member installed between a vehicle body and a wheel of a vehicle, and generates a driving force related to vibration damping of the vehicle using an electric motor. The electromagnetic actuator includes a ball screw mechanism in addition to the electric motor. The electromagnetic actuator operates to generate a driving force related to vibration damping of the vehicle by converting rotary motion of the electric motor into linear motion of the ball screw mechanism.

In this conventional electrically powered suspension system, a dynamic friction force is generated in a mechanism portion such as a ball screw mechanism. For example, when the vehicle starts to move in a low-temperature environment, the dynamic friction force is large because the viscosity of grease present in the mechanism portion of the electromagnetic actuator is high. In this case, the driving force generated by the electromagnetic actuator is not transmitted properly to a sprung member and an unsprung member. This may result in degradation in ride comfort and steering stability.

To address this problem derived from the dynamic friction force, there is proposed an electromagnetic actuator of an electrically powered suspension system including an equivalent friction force calculation unit configured to calculate an equivalent friction force of the electromagnetic actuator based on a stroke velocity of the electromagnetic actuator, and an ECU configured to calculate a target driving force of the electromagnetic actuator and to control a driving force of the electromagnetic actuator using the calculated target driving force. The ECU corrects the target driving force based on the equivalent friction force calculated by the equivalent friction force calculation unit.

According to the conventional electrically powered suspension system including such an electromagnetic actuator, it is possible to quickly reduce an influence of Coulomb friction force (dynamic friction force) generated in each portion of the electromagnetic actuator.

SUMMARY

The inventors of this application have found that an unusual noise may be generated around the mechanism portion of the electromagnetic actuator in this electrically powered suspension system when a stroke direction of the electromagnetic actuator is reversed.

In particular, if the electrically powered suspension system is mounted on a relatively heavy vehicle, an unusual noise generated around the mechanism portion of the electromagnetic actuator is prone to occur noticeably because an influence of the friction force generated in the electromagnetic actuator is relatively large. This problem has not been clearly recognized so far and thus the conventional electrically powered suspension system has not provided a solution to achieve this problem.

Accordingly, there is a need to further improve the conventional electrically powered suspension system to solve the problem of the unusual noise generated around the mechanism portion of the electromagnetic actuator when the stroke direction of the electromagnetic actuator is reversed.

The present invention has been made in view of the above circumstances, and an object of the present invention is to provide an electrically powered suspension system capable of suppressing an unusual noise generated around the mechanism portion of the electromagnetic actuator when the stroke direction of the electromagnetic actuator is reversed.

In one aspect, the present invention relates to an electrically powered suspension system comprising: an electromagnetic actuator disposed in parallel with a spring member installed between a vehicle body and a wheel of a vehicle and configured to generate a driving force related to vibration damping of the vehicle; an information acquisition unit configured to acquire time-series information related to a stroke position of the electromagnetic actuator, information on a stroke velocity, and an amount of change in a stroke of the electromagnetic actuator and information on a stroke direction based on the time-series information related to the stroke position; a damping force calculation unit configured to calculate a target damping force that is a target value of a damping operation of the electromagnetic actuator based on the information on the stroke velocity acquired by the information acquisition unit; and a drive control unit configured to control driving of the electromagnetic actuator using a target driving force obtained based on the target damping force calculated by the damping force calculation unit.

The main feature of the damping force calculation unit is that it calculates an equivalent friction compensation force (used for compensating an equivalent friction force) in relation to the electromagnetic actuator based on the amount of change in the stroke and the information on the stroke direction acquired by the information acquisition unit, and corrects the target damping force based on the calculated equivalent friction compensation force, and that the equivalent friction compensation force is composed of mainly an elastic force component and a dynamic friction force component.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1:
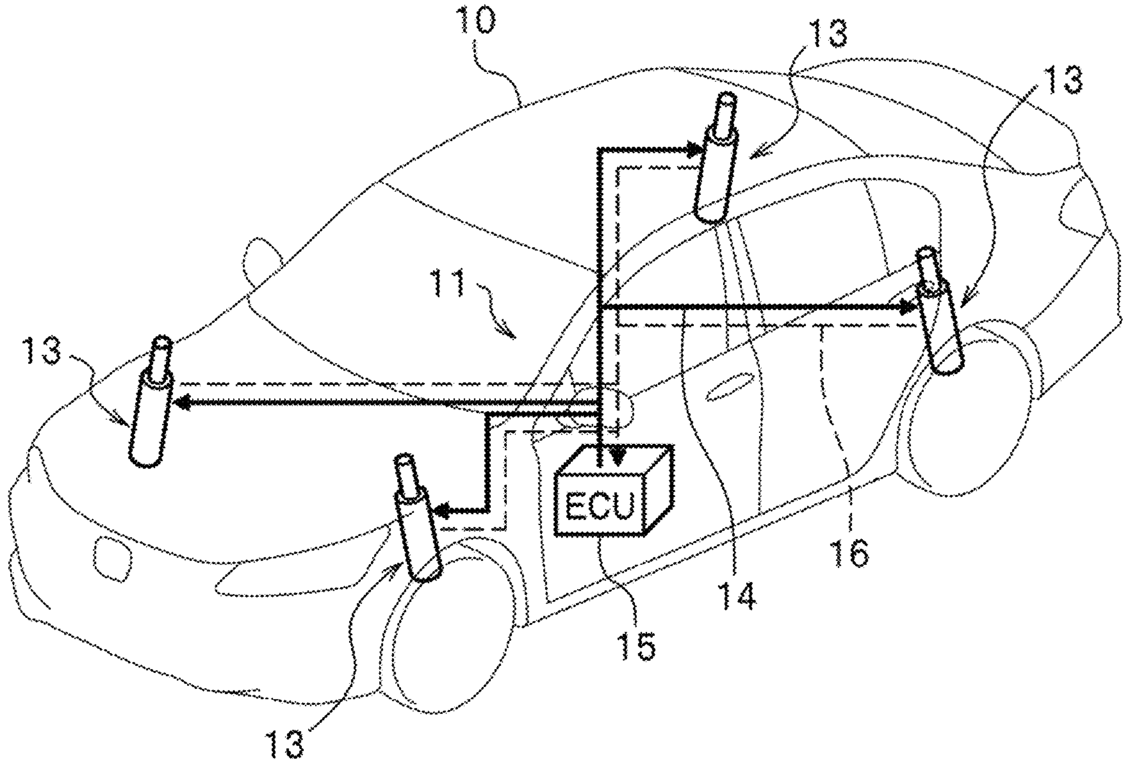
FIG. 1 is a diagram showing an overall configuration of an electrically powered suspension system according to one embodiment of the present invention.

An electrically powered suspension system according to one embodiment of the present invention will be described in detail with reference to the drawings.

In the following drawings, the same reference numeral is assigned to components each having a common function. In addition, the size and shape of a component may be schematically illustrated by being deformed or exaggerated for convenience of explanation.

<Common Basic Configuration of an Electrically Powered Suspension System 11 According to One Embodiment of Present Invention>

First, a basic configuration of an electrically powered suspension system 11 according to one embodiment of the present invention will be described with reference to FIGS. 1 and 2.

FIG. 1 is a diagram showing the overall configuration of an electrically powered suspension system 11 according to one embodiment of the present invention. FIG. 2 is a partially sectional view of an electromagnetic actuator 13 constituting the electrically powered suspension system 11.

As seen in FIG. 1, the electrically powered suspension system 11 according to this embodiment includes a plurality of electromagnetic actuators 13 respectively provided for wheels of a vehicle 10, and an electronic control unit (hereinafter referred to as an "ECU") 15. The plurality of electromagnetic actuators 13 and the ECU 15 are connected to each other via a power supply line 14 (see a solid line in FIG. 1) for supplying drive control power from the ECU 15 to the plurality of electromagnetic actuators 13 and via a signal line 16 (see a dashed line in FIG. 1) for transmitting a rotation angle signal of an electric motor 31 (see FIG. 2) from each of the plurality of electromagnetic actuators 13 to the ECU 15.

In this embodiment, four electromagnetic actuators 13 are respectively provided for the wheels including front wheels (front right wheel, front left wheel) and rear wheels (rear right wheel, rear left wheel). The electromagnetic actuators 13 provided for the wheels are independently controlled to drive in synchronization with extension and contraction at the corresponding wheels.

Unless otherwise stated, each of the plurality of electromagnetic actuators 13 has a common configuration in the embodiment. Therefore, the plurality of electromagnetic actuators 13 will be described by describing a configuration of one electromagnetic actuator 13.

Figure 2:
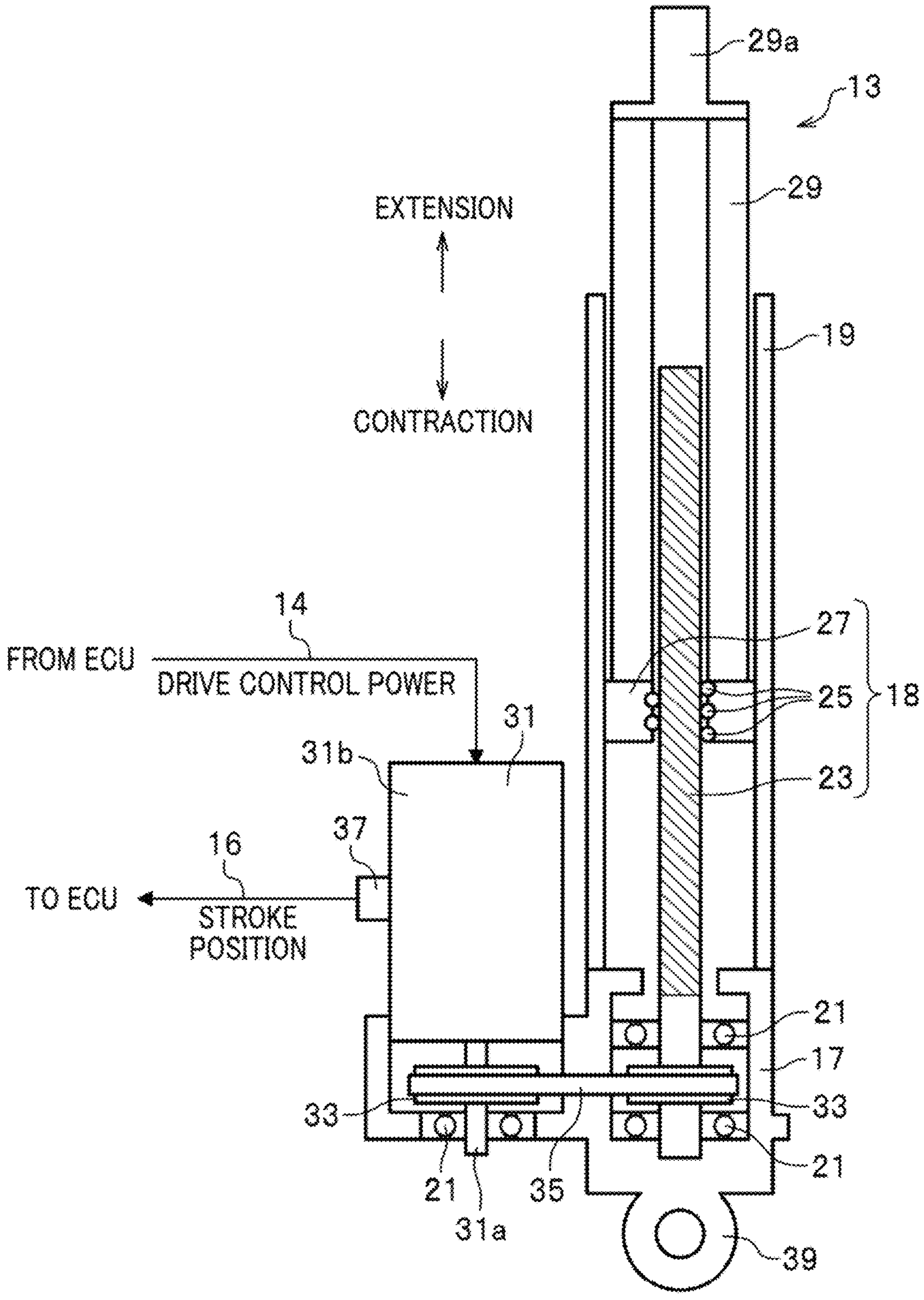
FIG. 2 is a partially sectional view of an electromagnetic actuator equipped in the electrically powered suspension system.

As seen in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a base portion of the ball screw shaft 23 axially rotatably via the ball bearing 21. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25, and converts rotational motion of the ball screw shaft 23 into linear motion. The inner tube 29 connected to the nut 27 is integrated with the nut 27 and displaceable in an axial direction of the outer tube 19.

As seen in FIG. 2, the electromagnetic actuator 13 includes the electric motor 31, a pair of pulleys 33, and a belt member 35 in order to transmit a rotary drive force to the ball screw shaft 23. The electric motor 31 is provided on the base housing 17 so as to be arranged in parallel with the outer tube 19. The pulleys 33 are respectively attached to a motor shaft 31*a* of the electric motor 31 and the ball screw shaft 23. The belt member 35 for transmitting the rotary drive force of the electric motor 31 to the ball screw shaft 23 is looped between the pair of pulleys 33.

The electric motor 31 is provided with a resolver 37 for detecting a rotation angle signal of the electric motor 31. The rotation angle signal of the electric motor 31 detected by the resolver 37 is sent to the ECU 15 via the signal line 16. The electric motor 31 is controlled to be rotationally driven by the ECU 15 in accordance with the drive control power to be supplied to each of the plurality of electromagnetic actuators 13 via the power supply line 14.

According to this embodiment, as seen in FIG. 2, a dimension in the axial direction of the electromagnetic actuator 13 is shortened by employing a layout in which the motor shaft 31*a* of the electric motor 31 and the ball screw shaft 23 are arranged substantially in parallel and connected to each other. However, another layout may be employed in which the motor shaft 31*a* of the electric motor 31 and the ball screw shaft 23 are coaxially arranged and connected to each other.

As seen in FIG. 2, the electromagnetic actuator 13 according to this embodiment has a connecting portion 39 provided at a lower end of the base housing 17. The connecting portion 39 is connected and fixed to an unsprung member (not shown) such as a lower arm and a knuckle provided on the wheel. On the other hand, an upper end portion 29*a* of the inner tube 29 is connected and fixed to a sprung member (not shown) such as a strut tower portion provided on the vehicle body. In other words, the electromagnetic actuator 13 is arranged in parallel with a spring member (not shown) provided between the vehicle body and the wheel of the vehicle 10.

The electromagnetic actuator 13 configured as described above operates as follows. For example, it is assumed that momentum related to upward vibration is inputted to the connecting portion 39 from the wheel of the vehicle 10. In this case, the inner tube 29 and the nut 27 try to integrally descend with respect to the outer tube 19 to which the momentum related to the upward vibration has been applied. In response to this, the ball screw shaft 23 tries to rotate in a direction following the nut 27 descending. At this time, the rotary drive force of the electric motor 31 in a direction preventing the nut 27 from descending is generated. The rotary drive force of the electric motor 31 is transmitted to the ball screw shaft 23 via the belt member 35.

In this way, the vibration transmitted from the wheel to the vehicle body is attenuated by applying a reaction force (damping force) that is against the momentum related to the upward vibration to the ball screw shaft 23.

<Internal Configuration of ECU 15>

Figure 3:
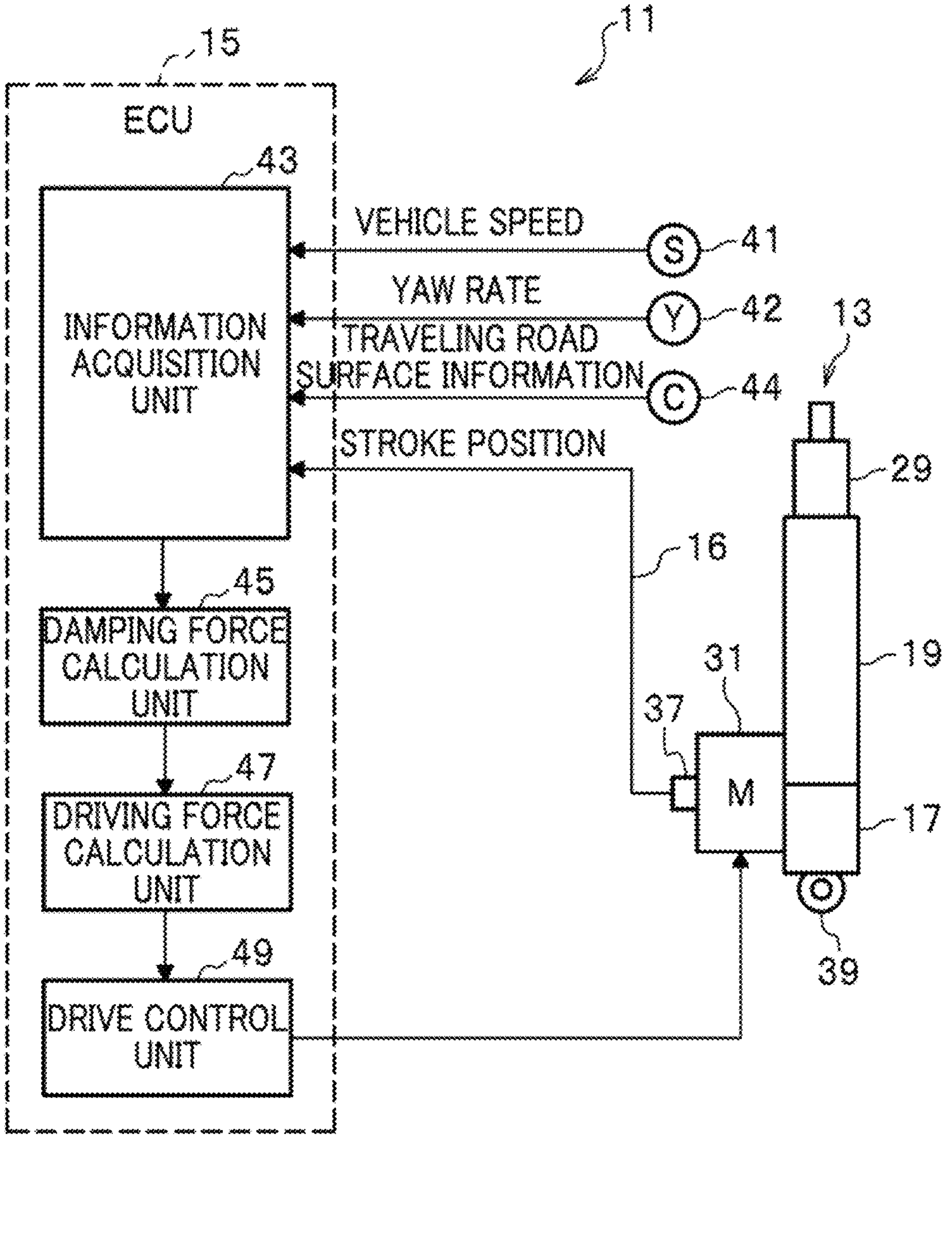
FIG. 3 is a diagram showing an internal configuration and a peripheral configuration of an ECU equipped in the electrically powered suspension system.

Next, an internal configuration and a peripheral configuration of the ECU 15 equipped in the electrically powered suspension system 11 will be described with reference to FIG. 3. FIG. 3 is a diagram showing the internal configuration and the peripheral configuration of the ECU 15 equipped in the electrically powered suspension system 11.

The ECU 15 includes a microcomputer configured to perform various arithmetic processing. The ECU 15 has a drive control function of generating a driving force related to vibration damping of the vehicle by controlling driving of each of the plurality of electromagnetic actuators 13, for example, based on a rotation angle signal of the electric motor 31 detected by the resolver 37.

In order to achieve this drive-controlling function, as seen in FIG. 3, the ECU 15 includes an information acquisition unit 43, a damping force calculation unit 45A, a driving force calculation unit 47, and a drive control unit 49.

The information acquisition unit 43 acquires the rotation angle signal of the electric motor 31 detected by the resolver 37 as time-series information related to a stroke position, and acquires information on a stroke velocity SV by time-differentiating the time-series information related to the stroke position.

Further, the information acquisition unit 43 acquires, at intervals of a predetermined unit time (control cycle), the amount of change in the stroke ΔSA of the electromagnetic actuator 13 and information on a stroke direction based on the time-series information related to the stroke position. Details of this process will be described later.

As seen in FIG. 3, the information acquisition unit 43 further acquires a vehicle speed detected by a vehicle speed sensor 41, information on a yaw rate (steering angle) detected by a yaw rate sensor 42, information on image data of a road surface (hereinafter referred to as "traveling road surface information") acquired by a CCD camera 44 that is mounted on a front side of the vehicle 10 and configured to look at the road surface ahead of the vehicle 10 traveling.

The vehicle speed, the yaw rate (steering angle), and the travelling road surface information are referred to when the ECU 15 corrects an equivalent friction compensation force characteristic related to a pre-post-compensation equivalent friction compensation force map 58 (see FIG. 4D: to be described later in detail).

To be more specific, information on the vehicle speed is used in a damping force calculation unit 45B (to be described later) according to a first modification. The yaw rate (steering angle) is used in a damping force calculation unit 45B (to be described later) according to a second modification. The travelling road surface information is used in a damping force calculation unit 45B (to be described later) according to a third modification.

For this reason, the information acquisition unit 43 of the electrically powered suspension system 11 related to the example may not require any of the information on the vehicle speed, the information on the yaw rate (steering angle information), and the travelling road surface information.

Information on a stroke velocity SV (unit: m/s) acquired by the information acquisition unit 43 at intervals of a predetermined unit time (control cycle), information on the amount of change in the stroke ΔSA (unit: m) and the stroke direction, and information on the vehicle speed, the yaw rate, and the travelling road surface are sent respectively to a damping force calculation unit 45.

The damping force calculation unit 45A according to the example calculates a target damping force that is a target value of a damping operation of the electromagnetic actuator 13 based on the information on the stroke velocity SV acquired by the information acquisition unit 43.

Further, the damping force calculation unit 45A calculates an equivalent friction compensation force Fif (consisting of an elastic force component Fef and a dynamic friction force component Fcf) for the purpose of compensating an equivalent friction force in relation to the electromagnetic actuator 13 based on the information on the amount of change in the stroke ΔSA and the stroke direction acquired by the information acquisition unit 43 at intervals of a predetermined unit time (control cycle), and corrects the target damping force based on the calculated equivalent friction compensation force Fif. The calculation of the equivalent friction compensation force Fif and the correction of the target damping force will be described later in detail.

A control signal related to the corrected target damping force that is calculated by the damping force calculation unit 45A is sent to the driving force calculation unit 47.

Herein, the damping force calculation unit 45A calculates the equivalent friction compensation force Fif by referring to the equivalent friction compensation force characteristic related to the pre-post-compensation equivalent friction compensation force map 58, and then corrects the target damping force based on the calculated equivalent friction compensation force Fif.

However, the equivalent friction compensation force characteristic related to the pre-post-compensation equivalent friction compensation force map 58 may be corrected either based on the information on the vehicle speed (to be described later in detail as the damping force calculation unit 45B according to the first modification), based on the yaw rate (steering information) (to be described later in detail as the damping force calculation unit 45B according to the second modification), or based on the travelling road surface information (to be described later in detail as the damping force calculation unit 45B according to the third modification).

Further, the equivalent friction compensation force characteristic related to the pre-post-compensation equivalent friction compensation force map 58 may be corrected based on an operational condition of the electromagnetic actuator 13 as to whether the electromagnetic actuator 13 extends or contracts (to be described later in detail as the damping force calculation unit 45B according to the fourth modification).

Hereinafter, the damping force calculation unit 45A according to this embodiment and the damping force calculation units 45B according to the first to fourth modifications are collectively referred to as a damping force calculation unit 45.

The driving force calculation unit 47 receives a control signal related to the target damping force calculated by the damping force calculation unit 45A, and obtains (calculates) a drive control signal for providing the target damping force. The drive control signal obtained as the computational result of the driving force calculation unit 47 is sent to the drive control unit 49.

The drive control unit 49 supplies a drive control power to an electric motor 31 provided in each of the plurality of electromagnetic actuators 13 according to the drive control signal sent from the driving force calculation unit 47, and thus independently controls driving of each of the plurality of electromagnetic actuators 13. For example, an inverter control circuit is suitably used for generating the drive control power to be supplied to the electric motor 31.

<Internal Configuration of the Damping Force Calculation Unit 45A Equipped in the ECU 15>

Next, with reference to FIGS. 4A to 4D, a description will be given to the internal configuration of the damping force calculation unit 45A that is equipped in the ECU 15 of the electrically powered suspension system 11.

Figure 4A:
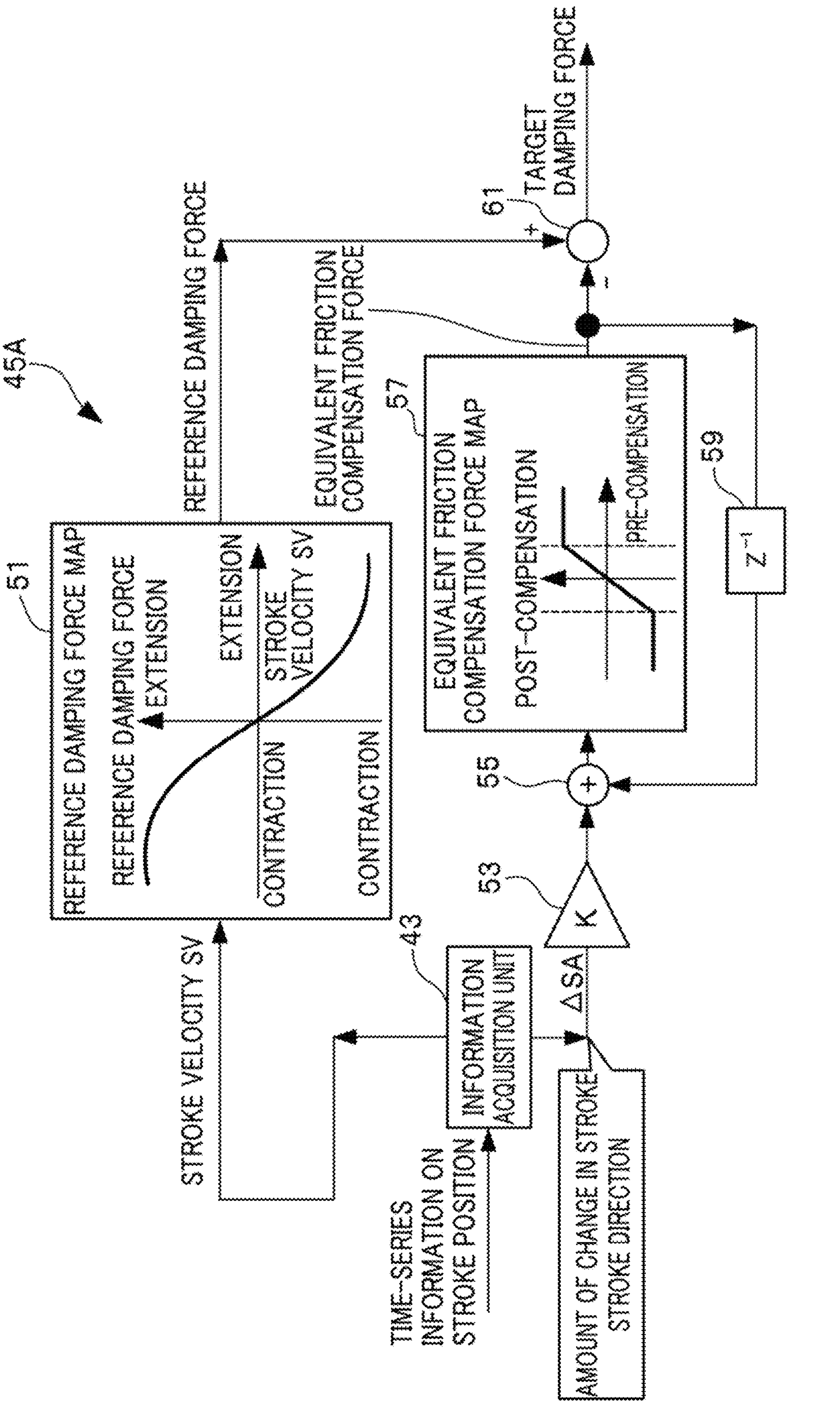
FIG. 4A is a block diagram conceptually illustrating an internal configuration of a damping force calculation unit according to this embodiment that is equipped in the ECU of the electrically powered suspension system.
Figure 4B:
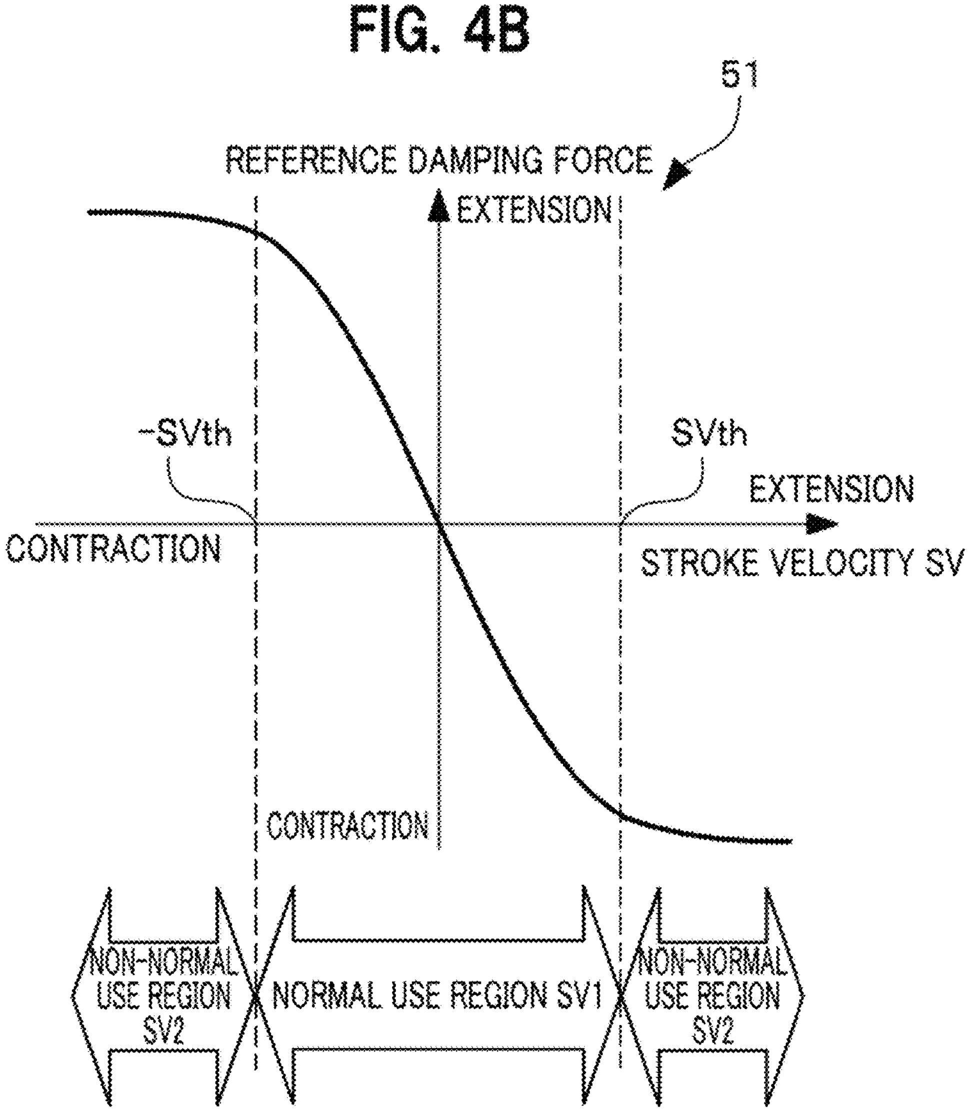
FIG. 4B is a diagram explaining a reference damping force map representing a relationship between a stroke velocity and a reference damping force.
Figure 4C:
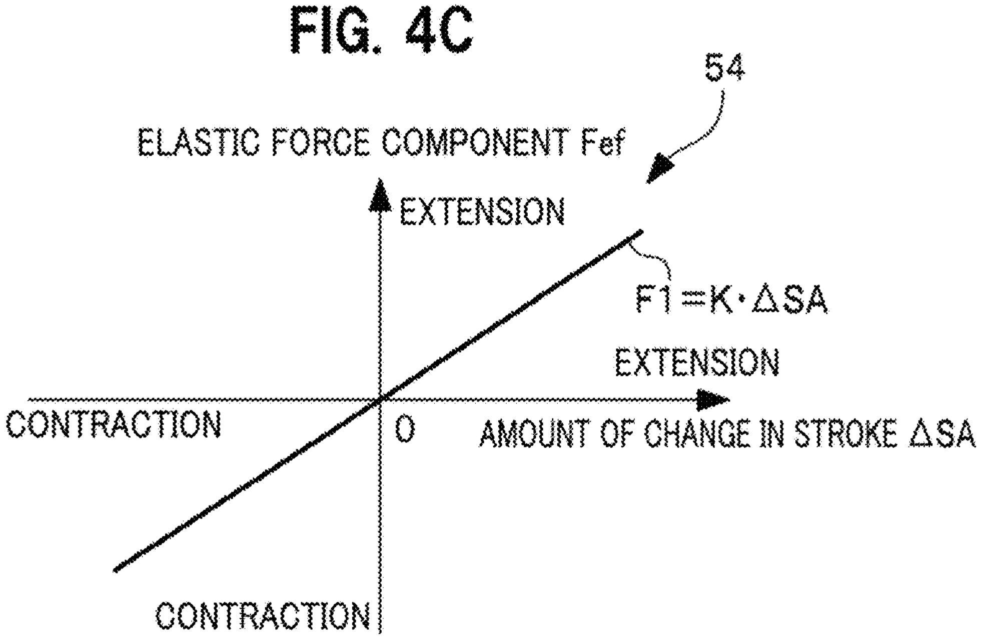
FIG. 4C is a diagram explaining an elastic force component map representing a relationship between an amount of change in a stroke and an elastic force component.

FIG. 4A is a block diagram conceptually illustrating an internal configuration of the damping force calculation unit 45A that is equipped in the ECU 15 of the electrically powered suspension system 11. FIG. 4B is a diagram explaining a reference damping force map 51 representing a relationship between a stroke velocity SV and a reference damping force. FIG. 4C is a diagram explaining an elastic force component map 54 representing a relationship between an amount of change in a stroke ΔSA and an elastic force component Fef. FIG. 4D is a diagram explaining a pre-post-compensation equivalent friction compensation force map 58 according to this embodiment, in which a relationship before and after compensation for an equivalent friction compensation force is conceptually shown.

The ECU 15 equipped in the electrically powered suspension system 11 includes the information acquisition unit 43. As seen in FIG. 4A, the information acquisition unit 43 receives information on a stroke velocity SV and sends this information to the reference damping force map 51 stored in the damping force calculation unit 45.

As seen in FIG. 4A, the damping force calculation unit 45A includes the reference damping force map 51, an elastic force component calculation unit 53, an adder 55, an equivalent friction compensation force calculation unit 57, a sample holding unit ($Z^{-1}$) 59, and a subtractor 61.

As seen in FIGS. 4A and 4B, the reference damping force map 51 stores values of a reference damping force whose magnitude changes in association with a change in the stroke velocity SV. It is noted that the values of the reference damping force are actually stored as values of a reference damping force control current.

The reference damping force is a damping force serving as a reference previously set to correspond to a change in the stroke velocity SV. According to the present invention, an equivalent friction compensation force Fif for compensating an equivalent friction force in relation to the electromagnetic actuator 13 is calculated based on the information on the amount of change in the stroke ΔSA and the stroke direction acquired by the information acquisition unit 43 at intervals of a unit time (control cycle). Then, the reference damping force (target damping force) is corrected based on the calculated equivalent friction compensation force Fif.

According to the electrically powered suspension system 11 of this embodiment, applying the equivalent friction compensation force Fif for compensating the equivalent friction force makes it possible to obtain the target damping force having an appropriate value for suppressing an unusual noise generated around the mechanism portion of the electromagnetic actuator 13 when the stroke direction of the electromagnetic actuator 13 is reversed.

As seen in FIG. 4B, a change region of the stroke velocity SV in relation to the reference damping force map 51 consists of a normal use region SV1 and non-normal use regions SV2. The normal use region SV1 is a velocity region in which the stroke velocity SV is equal to or lower than a normal use velocity threshold value SVth ($|SV| \leq |SVth|$). During the normal running of the vehicle, values of the stroke velocity SV mostly converge to the normal use region SV1.

The normal use velocity threshold value SVth may be set to an appropriate value by referring to an evaluation result acquired by evaluating the probability density function of the stroke velocity SV through experiments, simulations, etc., and taking into account the fact that a distribution ratio of the stroke velocity SV appearing in the normal use region SV1 and the non-normal use regions SV2 satisfies a predetermined distribution ratio.

As seen in FIG. 4B, a reference damping force characteristic related to the reference damping force map 51 in the normal use region SV1 has a characteristic such that as the stroke velocity SV increases toward the extension direction, the reference damping force directed to the contraction direction increases substantially linearly, whereas as the stroke velocity SV increases toward the contraction direction, the reference damping force directed to the extension direction increases substantially linearly. This characteristic conforms to the damping characteristic of the conventionally used hydraulic damper. When the stroke velocity SV is zero, the corresponding reference damping force is also zero.

Similar to the reference damping force characteristic related to the reference damping force map 51 in the normal use region SV1, as seen in FIG. 4B, a reference damping force characteristic related to the reference damping force map 51 in the non-normal use region SV2 has a characteristic such that as the stroke velocity SV increases toward the extension direction, the reference damping force directed to the contraction direction increases substantially linearly, whereas as the stroke velocity SV increases toward the contraction direction, the reference damping force directed to the extension direction increases substantially linearly.

However, as seen in FIG. 4B, the reference damping force characteristic related to the reference damping force map 51 in the non-normal use region SV2 is set to have a gentle slope as compared with the slope of the reference damping force characteristic related to the reference damping force map 51 in the normal use region SV1. This characteristic also conforms to the damping characteristic of the conventionally used hydraulic damper.

The damping force calculation unit 45A refers to the stroke velocity SV acquired by the information acquisition unit 43 and the stored contents of the reference damping force map 51 and calculates the value of the reference damping force having the magnitude corresponding to the stroke velocity SV. The value of the reference damping force thus calculated is sent to the subtractor 61.

Meanwhile, as seen in FIG. 4A, the information acquisition unit 43 receives and sends to the elastic force component calculation unit 53 the information on the amount of change in the stroke ΔSA and the stroke direction at intervals of a predetermined unit time (control cycle).

As seen in FIG. 4C, the elastic force component calculation unit 53 includes an elastic force component map 54 representing the relationship between the amount of change in the stroke ΔSA and the elastic force component Fef. As shown in FIG. 4C, the elastic force component map 54 stores values of the elastic force component Fef that change linearly in association with the change in the amount of change in the stroke ΔSA.

As seen in FIG. 4C, an elastic force component characteristic related to the elastic force component map 54 has a characteristic such that as the amount of change in the stroke ΔSA increases toward the extension direction, the elastic force component Fef directed to the extension direction increases via a predetermined linear function F1 ($F1=K\times\Delta SA$; where K is the elastic modulus (N/m)), whereas as the amount of change in the stroke ΔSA increases toward the contraction direction, the elastic force component Fef directed to the contraction direction increases via the linear function F1. When the amount of change in the stroke ΔSA is zero, the corresponding elastic force component Fef is also zero.

The elastic force component characteristic related to the elastic force component map 54 shown in FIG. 4C has been described by taking an example where the value of the elastic force component Fef changes, via the predetermined linear function F 1, according to the amount of change in the stroke ΔSA. However, the present invention is not limited to this specific embodiment. An alternative embodiment may be adopted, in which as the elastic force component characteristic related to the elastic force component map 54, the value of the elastic force component Fef changes, via a predetermined nonlinear function, according to the amount of change in the stroke ΔSA.

The elastic force component calculation unit 53 calculates, based on the amount of change in the stroke ΔSA that is inputted from time to time and the stored contents of the elastic force component map 54, the value of the elastic force component Fef according to the inputted amount of change in the stroke ΔSA, and sends the calculated value of the elastic force component Fef to the adder 55.

The adder 55 adds the value of the elastic force component Fef calculated by the elastic force component calculation unit 53 to a sampled holding value $Fif(Z^{-1})$ of the sample holding unit $(Z^{-1})$ 59 acquired at the latest control cycle that is a value of a post-compensation equivalent friction compensation force calculated by the equivalent friction compensation force calculation unit 57 to be described later. The adder 55 outputs to the equivalent friction compensation force calculation unit 57 the value of a pre-compensation equivalent friction compensation force Fif that is the result of addition.

Figure 4D:
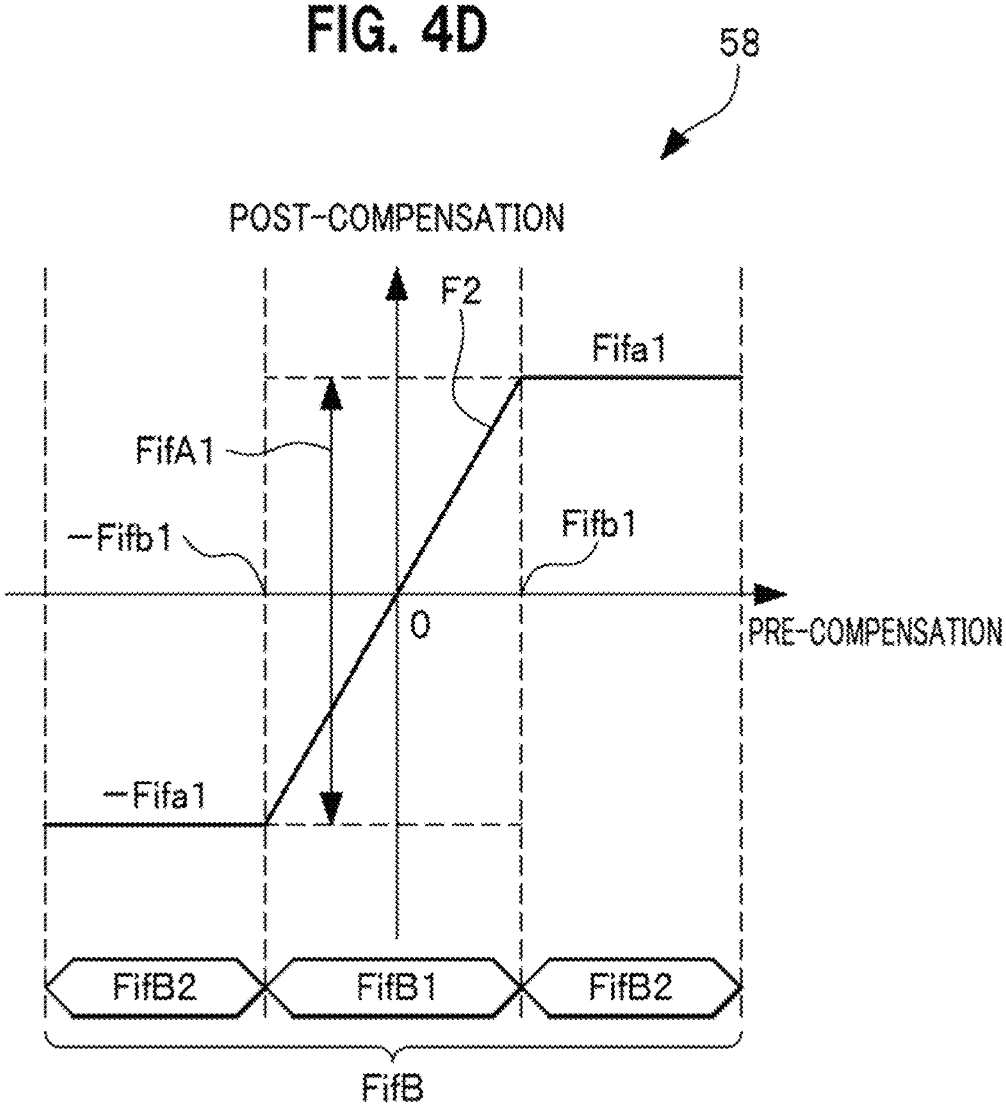
FIG. 4D is a diagram explaining a pre-post-compensation equivalent friction compensation force map according to this embodiment, in which a relationship before and after compensation for an equivalent friction compensation force is conceptually shown.

As seen in FIG. 4D, the equivalent friction compensation force calculation unit 57 includes a pre-post-compensation equivalent friction compensation force map (hereinafter simply referred to as an "equivalent friction compensation force map") 58. The equivalent friction compensation force map 58 stores information on the relationship before and after compensation for the equivalent friction compensation force Fif. As seen in FIG. 4D, the equivalent friction compensation force map 58 stores values of the post-compensation equivalent friction compensation force Fif whose magnitude changes in association with the change in the pre-compensation equivalent friction compensation force Fif outputted from the adder 55.

It is noted that the equivalent friction compensation force map 58 actually stores target values of an equivalent friction compensation force control current for achieving the equivalent friction compensation force Fif as values corresponding to the values of the post-compensation equivalent friction compensation force Fif.

In the equivalent friction compensation force map 58, as shown in the horizontal axis of FIG. 4D, a positive pre-compensation critical value Fifb1 and a negative pre-compensation critical value −Fifb1 (Fifb1>−Fifb1) are set in a domain FifB related to the pre-compensation equivalent friction compensation force Fif.

As shown in the horizontal axis of FIG. 4D, the domain FifB related to the pre-compensation equivalent friction compensation force Fif consists of a first domain FifB1 and a pair of second domains FifB2. The first domain FifB1 is an intermediate region containing zero with its start value and end value being defined by the positive pre-compensation critical value Fifb1 and the negative pre-compensation critical value −Fifb1, respectively. The pair of second domains FifB2 are regions without containing zero and located outside the first domain FifB1. The start value and the end value of the second domains FifB2 are defined by the positive pre-compensation critical value Fifb1 and the negative pre-compensation critical value −Fifb1.

Meanwhile, as shown in the vertical axis of FIG. 4D, a positive post-compensation critical value Fifa1 and a negative post-compensation critical value −Fifa1 (Fifa1>−Fifa1) are set in a range FifA related to the pre-compensation equivalent friction compensation force Fif.

As shown in the vertical axis of FIG. 4D, the range FifA related to the post-compensation equivalent friction compensation force Fif consists of a first range FifA1. The first range FifA1 is an intermediate region containing zero with its start value and end value being defined by the positive post-compensation critical value Fifa1 and the negative post-compensation critical value −Fifa1.

The domain FifB related to the pre-compensation equivalent friction compensation force Fif and the range FifA related to the post-compensation equivalent friction compensation force Fif are associated with each other via a predetermined function.

To be more specific, the first domain FifB1 of the domain FifB related to the pre-compensation equivalent friction compensation force Fif is associated with the first range FifA1 related to the post-compensation equivalent friction compensation force Fif via a predetermined linear function F2 and along the vertical axis of FIG. 4D.

The equivalent friction compensation force characteristic related to the equivalent friction compensation force map 58 shown in FIG. 4D has been described by taking an example where the first domain FifB1 of the domain FifB related to the pre-compensation equivalent friction compensation force Fif is associated with the first range FifA1 related to the post-compensation equivalent friction compensation force Fif via a predetermined linear function F2. However, the present invention is not limited to this specific embodiment.

An alternative embodiment may be adapted, in which as the equivalent friction compensation force characteristic related to the equivalent friction compensation force map 58, the first domain FifB1 of the domain FifB related to the pre-compensation equivalent friction compensation force Fif is associated with the first range FifA1 related to the post-compensation equivalent friction compensation force Fif via an appropriate non-linear function.

The pair of second domains FifB2 of the domain FifB related to the pre-compensation equivalent friction compensation force Fif are respectively associated with the positive post-compensation critical value Fifa1 and the negative post-compensation critical value −Fifa1 that are fixed values via a predetermined many-to-one function and along the vertical axis of the FIG. 4D.

The first domain FifB1 is a domain related to the pre-compensation equivalent friction compensation force Fif that is generated around the mechanism portion of the electromagnetic actuator 13 when the stroke direction of the electromagnetic actuator 13 is reversed.

The pre-compensation equivalent friction compensation force Fif belonging to the first domain FifB1 is replaced on one-by-one basis with the first range FifA1 related to the post-compensation equivalent friction compensation force Fif via a predetermined linear function F2. For example, the positive pre-compensation critical value Fifb1 and the negative pre-compensation critical value −Fifb1 are replaced with the positive post-compensation critical value Fifa1 and the negative post-compensation critical value −Fifa1, respectively.

The pair of second domains FifB2 are domains related to the pre-compensation equivalent friction compensation force Fif generated around the mechanism portion of the electromagnetic actuator 13 when the stroke direction of the electromagnetic actuator 13 is reversed and the amount of change in the stroke ΔSA accumulates after the inversion.

The pre-compensation equivalent friction compensation force Fif belonging to each of the pair of second domains FifB2 is replaced with the positive post-compensation critical value Fifa1 or the negative post-compensation critical value −Fifa1 that is a fixed value via a predetermined many-to-one function. The purpose of this configuration is to limit the post-compensation equivalent friction compensation force Fif in the pair of second domains FifB2, regardless of the increase in the pre-compensation equivalent friction compensation force Fif, by assigning a fixed value (post-compensation critical value) to the post-compensation equivalent friction compensation force Fif, thereby forming the equivalent friction compensation force Fif based on the elastic force component Fef and the dynamic friction force component Fcf, while suppressing an endless increase in the equivalent friction compensation force Fif.

The equivalent friction compensation force calculation unit 57 calculates the value of the post-compensation equivalent friction compensation force Fif suitable for the value of the pre-compensation equivalent friction compensation force Fif, based on the value of the equivalent friction compensation force Fif that is the result of addition by the adder 55 before compensation and the pre-post-compensation equivalent friction compensation force map 58. According to this embodiment, the post-compensation equivalent friction compensation force Fif consists of the elastic force component Fef and the dynamic friction force component Fcf.

The value of the post-compensation equivalent friction compensation force Fif calculated by the equivalent friction compensation force calculation unit 57 is sent to the sample holding unit ($Z^{-1}$) 59 and to the subtractor 61.

The sample holding unit ($Z^{-1}$) 59 holds a sampled value of the post-compensation equivalent friction compensation force Fif calculated by the equivalent friction compensation force calculation unit 57 for each control cycle, and returns the sampled holding value Fif($Z^{-1}$) acquired at the latest control cycle to the adder 55. In response, the adder 55 adds the value of the elastic force component Fef calculated by the elastic force component calculation unit 53 to the sampled holding value Fif($Z^{-1}$) acquired at the latest control cycle, and outputs to the equivalent friction compensation force calculation unit 57 the value of the equivalent friction compensation force Fif that is the result of addition.

The subtractor 61 subtracts the value of the post-compensation equivalent friction compensation force Fif from the value of the reference damping force calculated by the damping force calculation unit 45A to correct the target damping force (target control force).

Namely, the target control force is corrected for the friction generated around the mechanism portion of the electromagnetic actuator 13 and having the magnitude and the operating direction changing from time to time, in consideration of the elastic force component Fef in particular from the view point of elastic friction. Therefore, it is possible to ensure a friction compensation force having an appropriate magnitude and to suppress an unusual noise generated around the mechanism portion of the electromagnetic actuator 13 at a time when the stroke direction of the electromagnetic actuator 13 is reversed.

<Operation of the Electrically Powered Suspension System 11 According to this Embodiment>

Figure 5:
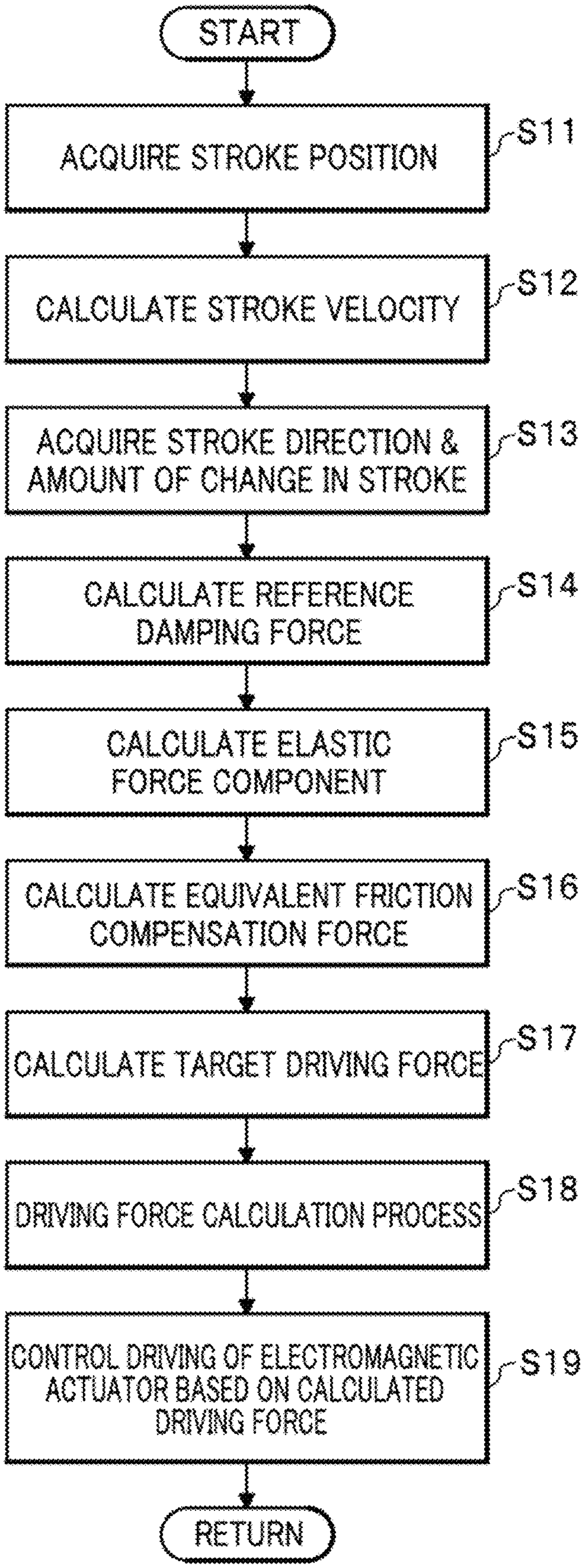
FIG. 5 is a flowchart for explaining an operation of the electrically powered suspension system according to this embodiment.

Next, the operation of the electrically powered suspension system 11 according to the embodiment will be described with reference to FIG. 5. FIG. 5 is a flowchart for explaining an operation of the electrically powered suspension system 11 according to the embodiment.

In step S11 (stroke position acquisition) shown in FIG. 5, the information acquisition unit 43 of the ECU 15 acquires a rotation angle signal of the electric motor 31 detected by the resolver 37 as time-series information on the stroke position.

In step S12 (stroke velocity calculation), the information acquisition unit 43 of the ECU 15 calculates the stroke velocity SV by time-differentiating the time-series information on the stroke position acquired in step S11. The information on the stroke velocity SV calculated in this way is sent to the damping force calculation unit 45.

In step S13 (acquisition of the stroke direction and the amount of change in the stroke), the ECU 15 sequentially inputs the time-series information related to the stroke position (rotation angle signal of the electric motor 31) acquired in step S11 at a predetermined control cycle, and calculates the amount of change in the stroke ΔSA that is a difference between two temporally adjacent stroke position data for each predetermined unit time (control cycle). Further, the ECU 15 acquires the information on the stroke direction based on a positive/negative sign related to the amount of change in the stroke ΔSA that is the result of this calculation.

In step S14 (reference damping force calculation), the damping force calculation unit 45 of the ECU 15 calculates the value of the reference damping force having the magnitude corresponding to the stroke velocity SV with reference to the stroke velocity SV calculated (acquired) in step S12 and the stored contents of the reference damping force map 51.

In step S15 (elastic force component calculation), the elastic force component calculation unit 53 belonging to the damping force calculation unit 45 of the ECU 15 calculates the value of the elastic force component Fef having the magnitude corresponding to the acquired amount of change in the stroke ΔSA, based on the amount of change in the stroke ΔSA acquired for each unit time (control cycle) in step S13, the information on the stroke direction, and the stored contents of the elastic force component map 54.

In step S16 (equivalent friction compensation force calculation), the equivalent friction compensation force calculation unit 57 belonging to the damping force calculation unit 45 of the ECU 15 calculates the value of the post-compensation equivalent friction compensation force Fif suitable for the value of the pre-compensation equivalent friction compensation force Fif, based on the value of the pre-compensation equivalent friction compensation force Fif that is the result of addition by the adder 55 (acquired by adding the value of the elastic force component Fef calculated by the elastic force component calculation unit 53 to the latest sampled holding value Fif(Z−1) acquired at the immediately preceding control cycle) and based on the pre-post-compensation equivalent friction compensation force map 58.

In step S17 (target control force calculation), the subtractor 61 belonging to the damping force calculation unit 45 of the ECU 15 calculates the target damping force (target control force) by the correction made by subtracting the value of the post-compensation equivalent friction compensation force Fif calculated in step S16 from the value of the reference damping force calculated in step S14.

In step S18 (driving force calculation process), the driving force calculation unit 47 of the ECU 15 calculates and obtains the drive control signal for providing the target damping force (target control force) calculated in step S17.

In step S19, the drive control unit 49 of the ECU 15 controls driving of the plurality of electromagnetic actuators 13 by supplying drive control power to the electric motor 31 provided in each of the plurality of electromagnetic actuators 13 in accordance with the drive control signal obtained by the calculation of step S18.

<Internal Configuration of the Damping Force Calculation Unit 45B According to a Modification>

Figure 6A:
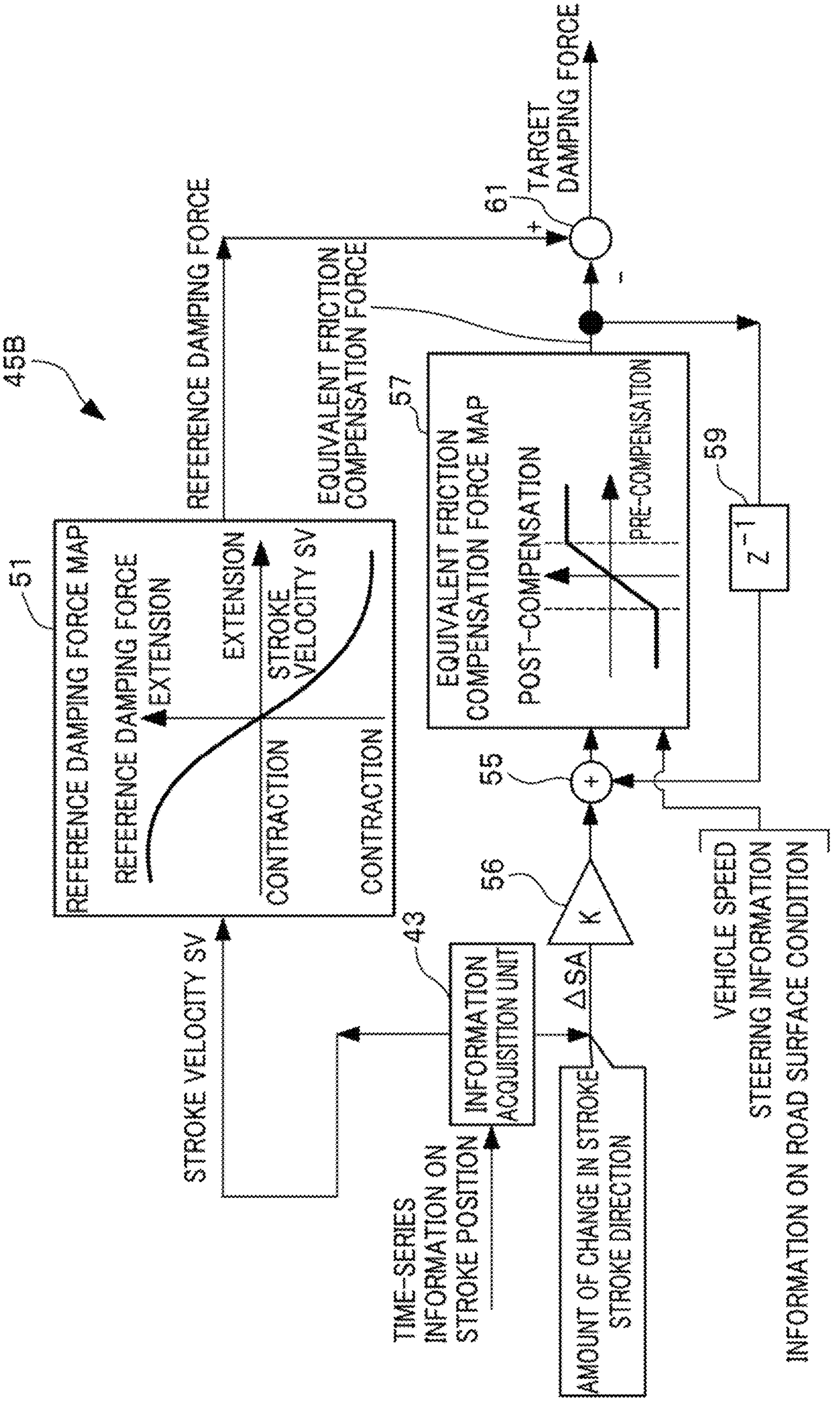
FIG. 6A is a block diagram conceptually illustrating an internal configuration of a damping force calculation unit according to a modification that is equipped in the ECU of the electrically powered suspension system.

Next, with reference to FIG. 6A, a description will be given to the internal configuration of the damping force calculation unit 45B according to a modification that is equipped in the ECU 15 of the electrically powered suspension system 11. FIG. 6A is a block diagram conceptually illustrating the internal configuration of the damping force calculation unit 45B according to the modification that is equipped in the ECU 15 of the electrically powered suspension system 11.

Many components are common between the electrically powered suspension system 11 according to the embodiment shown in FIG. 4A and the electrically powered suspension system 11 according to the modification shown in FIG. 6A.

Therefore, the configuration of the electrically powered suspension system 11 according to the modification will be described in detail by mainly describing differences between the electrically powered suspension system 11 according to the embodiment and the electrically powered suspension system 11 according to the modification.

The electrically powered suspension system 11 according to the modification is different from the electrically powered suspension system 11 according to the embodiment in that a different parameter or information is inputted to an equivalent friction compensation force map 58 included in the equivalent friction compensation force calculation unit 57 of the damping force calculation unit 45B according to the modification. To be more specific, in a first modification, the vehicle speed detected by the vehicle speed sensor 41 and acquired by the information acquisition unit 43 is inputted to an equivalent friction compensation force map 58 included in the equivalent friction compensation force calculation unit 57 of the damping force calculation unit 45B according to the modification. In a second modification, the yaw rate (steering information) detected by the yaw rate sensor 42 is inputted to an equivalent friction compensation force map 58 included in the equivalent friction compensation force calculation unit 57 of the damping force calculation unit 45B according to the modification. In a third modification, traveling road surface information (information on a road surface on which the vehicle is traveling) is inputted to an equivalent friction compensation force map 58 included in the equivalent friction compensation force calculation unit 57 of the damping force calculation unit 45B according to the modification. In a fourth modification, information on the stroke direction is inputted to an equivalent friction compensation force map 58 included in the equivalent friction compensation force calculation unit 57 of the damping force calculation unit 45B according to the modification.

The vehicle speed (in the first modification), the steering information (in the second modification), the traveling road surface information (in the third modification), and the information on the stroke direction (in the fourth modification) are referred to when the equivalent friction compensation force calculation unit 57 according to the modification corrects the equivalent friction compensation force characteristic related to the pre-post-compensation equivalent friction compensation force map. Details thereof will be described below.

<Equivalent Friction Compensation Force Map 58 According to the First Modification>

First, with reference to FIG. 6B, a description will be given to an equivalent friction compensation force map 58 according to the first modification that is included in the equivalent friction compensation force calculation unit 57 of the damping force calculation unit 45B according to the first modification.

Figure 6B:
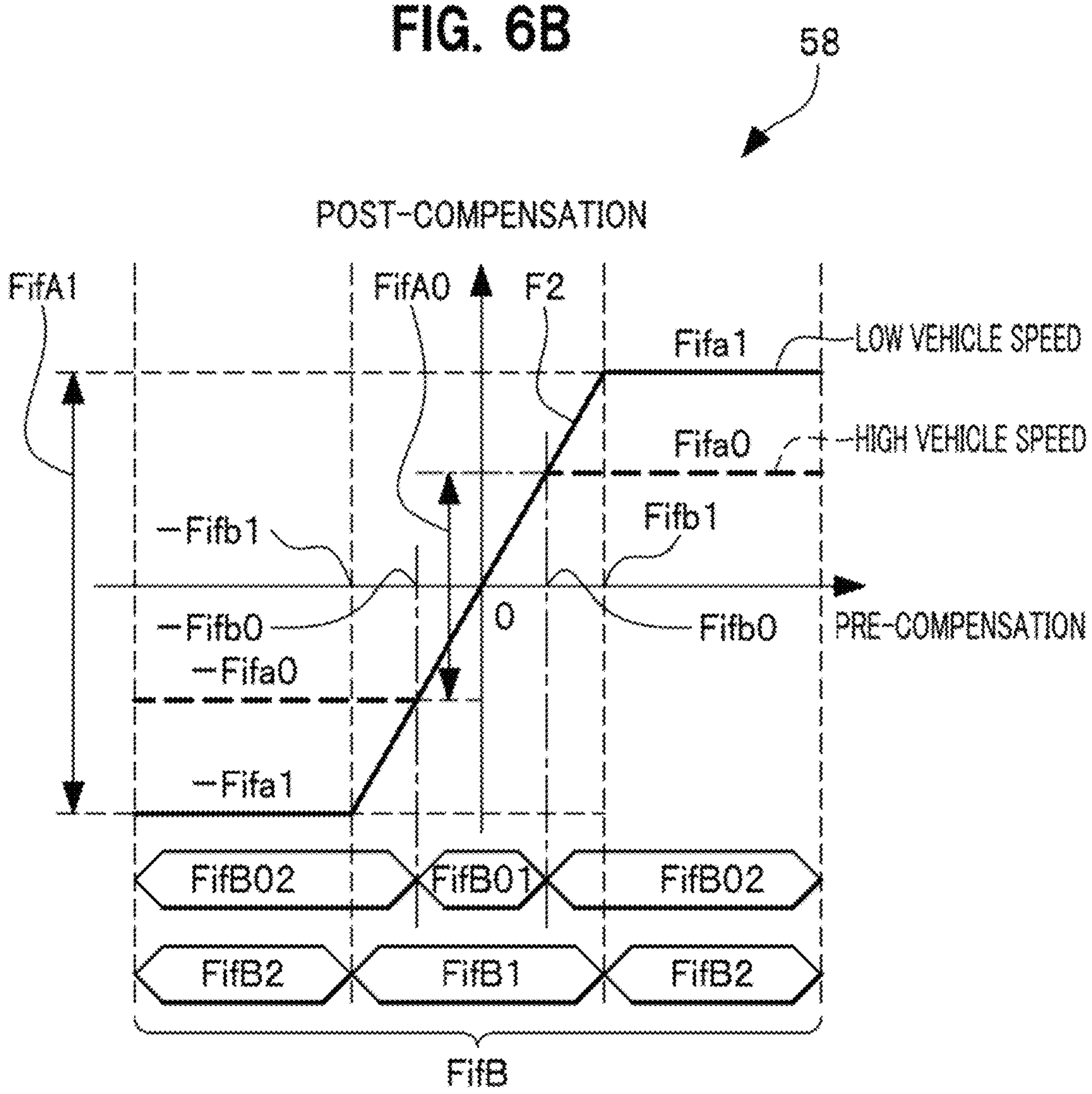
FIG. 6B is a diagram explaining a pre-post-compensation equivalent friction compensation force map according to a first modification, in which an equivalent friction compensation force is corrected based on information on a vehicle speed.

FIG. 6B is a diagram explaining a pre-post-compensation equivalent friction compensation force map 58 according to the first modification, in which the equivalent friction compensation force Fif is corrected based on information on the vehicle speed.

The electrically powered suspension system 11 according to the first modification including the damping force calculation unit 45B according to the first modification is different from the electrically powered suspension system 11 according to the embodiment including the damping force calculation unit 45A according to the embodiment in that the equivalent friction compensation force Fif is corrected based on the information on the vehicle speed.

To be more specific, as seen in FIG. 6B, a plurality of different equivalent friction compensation force characteristics are set in the pre-post-compensation equivalent friction compensation force map 58 according to the first modification that is included in the equivalent friction compensation force calculation unit 57 according to the first modification.

In the example shown in FIG. 6B, a plurality of systems set in the pre-post-compensation equivalent friction compensation force map 58 according to the first modification consists of two systems including a system corresponding to a low vehicle speed and a system corresponding to a high vehicle speed.

The equivalent friction compensation force calculation unit 57 according to the first modification switches between the two systems of equivalent friction compensation force characteristics for correction, among the plurality different systems of equivalent friction compensation force characteristics set in the pre-post-compensation equivalent friction compensation force map 58 according to the first modification, in accordance with the information on the vehicle speed acquired by the information acquisition unit 43 such that if the vehicle speed is low, the equivalent friction compensation force characteristic of the system corresponding to the low vehicle speed is used, whereas if the vehicle speed is high, the equivalent friction compensation force characteristic of the system corresponding to the high vehicle speed is used.

It is noted that the equivalent friction compensation force characteristic of the system corresponding to the low vehicle speed, among the plurality different systems of equivalent friction compensation force characteristics set in the pre-post-compensation equivalent friction compensation force map 58 according to the first modification, is associated with the equivalent friction compensation force characteristic of the single system (see FIG. 4D) set in the pre-post-compensation equivalent friction compensation force map 58 according to the embodiment.

In other words, as shown in FIG. 6B, the plurality different systems of equivalent friction compensation force characteristics according to the first modification includes the equivalent friction compensation force characteristic of the system corresponding to the high vehicle speed in addition to the equivalent friction compensation force characteristic of the single system according to the embodiment (see FIG. 4D).

To be more specific, in the equivalent friction compensation force characteristic of the system corresponding to the high vehicle speed that is set in the equivalent friction compensation force map 58 according to the first embodiment, as shown in the horizontal axis of FIG. 6B, a positive pre-compensation critical value Fifb0 and a negative pre-compensation critical value –Fifb0 (Fifb1>Fifb0>–Fifb0>–Fifb1) are set in a domain FifB related to the pre-compensation equivalent friction compensation force Fif.

In the equivalent friction compensation force characteristic of the system corresponding to the high vehicle speed, as shown in the horizontal axis of FIG. 6B, the domain FifB related to the pre-compensation equivalent friction compensation force Fif consists of a 1st domain FifB01 and a pair of 2nd domains FifB02. The 1st domain FifB01 is an intermediate region containing zero with its start value and end value being defined by the positive pre-compensation critical value Fifb0 and the negative pre-compensation critical value –Fifb0, respectively. The pair of 2nd domains FifB02 are regions without containing zero and located outside the 1st domain FifB01. The start value and the end value of the 2nd domains FifB02 are defined by the positive pre-compensation critical value Fifb0 and the negative pre-compensation critical value –Fifb0.

In other words, the width of the 1st domain FifB01 related to the system corresponding to the high vehicle speed (the width of the 1st domain FifB01 along the horizontal axis of FIG. 6B) is set narrower than the width of the first domain FifB1 related to the system corresponding to the low vehicle speed (the width of the first domain FifB1 along the horizontal axis of FIG. 6B). On the other hand, the width of the pair of 2nd domains FifB02 related to the system corresponding to the high vehicle speed (the width of the 2nd domains FifB02 along the horizontal axis of FIG. 6B) is set wider than the width of the pair of second domains FifB2 related to the system corresponding to the low vehicle speed (the width of the second domains FifB2 along the horizontal axis of FIG. 6B).

Meanwhile, in the equivalent friction compensation force characteristic of the system corresponding to the high vehicle speed, as shown in the vertical axis of FIG. 6B, a positive post-compensation critical value Fifa0 and a negative post-compensation critical value –Fifa0 (Fifa1>Fifa0>–Fifa0>–Fifa1) are set in a range FifA related to the pre-compensation equivalent friction compensation force Fif.

In the equivalent friction compensation force characteristic of the system corresponding to the high vehicle speed, as shown in the vertical axis of FIG. 6B, the range FifA related to the post-compensation equivalent friction compensation force Fif consists of a 1st range FifA0. The 1st range FifA0 is an intermediate region containing zero with its start value and end value being defined by the positive post-compensation critical value Fifa0 and the negative post-compensation critical value –Fifa0.

In other words, the height of the 1st range FifA0 related to the system corresponding to the high vehicle speed (the height of the 1st range FifA0 along the vertical axis of FIG. 6B) is set smaller than the height of the first range FifA1 related to the system corresponding to the low vehicle speed (the height of the first range FifA1 along the vertical axis of FIG. 6B).

The reason why the height of the 1st range FifA0 along the vertical axis of FIG. 6B in the system corresponding to the high vehicle speed is set smaller than the height of the first range FifA1 in the system corresponding to the low vehicle speed will be described below.

The adhesion of tires is low when the vehicle speed is high (i.e., the vehicle speed is in a high vehicle speed range) than when the vehicle speed is low (i.e., the vehicle speed is in a low vehicle speed range). For this reason, it is required in the high vehicle speed range (than in the low vehicle speed range) to ensure the adhesion of a tire, that is, to achieve a high level of steering stability, by sufficiently converging a violent fluctuation of the stroke velocity SV when the electrically powered suspension system 11 performs a damping control.

It should be noted that smaller in the value of the post-compensation equivalent friction compensation force Fif is better to achieve the effect of ensuring a high level of steering stability by the damping control. This is because the target damping force (target control force) is larger when the value of the post-compensation equivalent friction compensation force Fif is small than when the value of the post-compensation equivalent friction compensation force Fif is large.

Therefore, as shown in FIG. 6B, when the vehicle speed is in the high vehicle speed range, the equivalent friction compensation force calculation unit 57 according to the first modification performs a correction by switching to the equivalent friction compensation force characteristic in which the equivalent friction compensation force Fif becomes smaller as compared with the case where the vehicle speed is in the low vehicle speed range.

To be more specific, when calculating the equivalent friction compensation force Fif, the equivalent friction compensation force calculation unit 57 according to the first modification adjusts at least one of the elastic force component Fef and the dynamic friction force component Fcf based on the information on the vehicle speed, and performs a correction for the equivalent friction compensation force Fif based on the result of this adjustment.

As a result, as shown in FIG. 6B, the equivalent friction compensation force calculation unit 57 according to the first modification selects and uses the equivalent friction compensation force characteristic related to the system corresponding to the low vehicle speed (having a characteristic that the value of the post-compensation equivalent friction compensation force Fif is relatively large) when the vehicle speed is in the low vehicle speed range. On the contrary, the equivalent friction compensation force calculation unit 57 according to the first modification selects and uses the equivalent friction compensation force characteristic related to the system corresponding to the high vehicle speed (having a characteristic that the value of the post-compensation equivalent friction compensation force Fif is relatively small) when the vehicle speed is in the high vehicle speed range.

Consequently, the amount of damping control in the electrically powered suspension system 11 increases when the vehicle speed is in the high vehicle speed range than when the vehicle is in the low vehicle speed range.

Therefore, it is possible to achieve the effect of ensuring a high level of steering stability by the damping control even when the vehicle speed is in the high vehicle speed range.

Each of the pre-post-compensation equivalent friction compensation force map 58 according to first to fourth modifications is similar to the pre-post-compensation equivalent friction compensation force map 58 according to the embodiment in that the domain FifB related to the pre-compensation equivalent friction compensation force Fif and the range FifA related to the post-compensation equivalent friction compensation force Fif are correlated to each other via a predetermined linear function F2.

The equivalent friction compensation force calculation unit 57 according to first to fourth modifications calculate the value of the post-compensation equivalent friction compensation force Fif suitable for the value of the pre-compensation equivalent friction compensation force Fif, based on the value of the equivalent friction compensation force Fif before compensation that is the result of addition by the adder 55, the equivalent friction compensation force map 58, and the information on the vehicle speed, etc.

Similar to the damping force calculation unit 45A according to the embodiment, the value of the post-compensation equivalent friction compensation force Fif calculated by the equivalent friction compensation force calculation unit 57 is sent both to the sample holding unit ($Z^{-1}$) 59 and to the subtractor 61 in the damping force calculation unit 45B according to the first to fourth modifications.

<Equivalent Friction Compensation Force Map 58 According to the Second Modification>

Next, with reference to FIG. 6C, a description will be given to an equivalent friction compensation force map 58 according to the second modification that is included in the equivalent friction compensation force calculation unit 57 of the damping force calculation unit 45B according to the second modification.

Figure 6C:
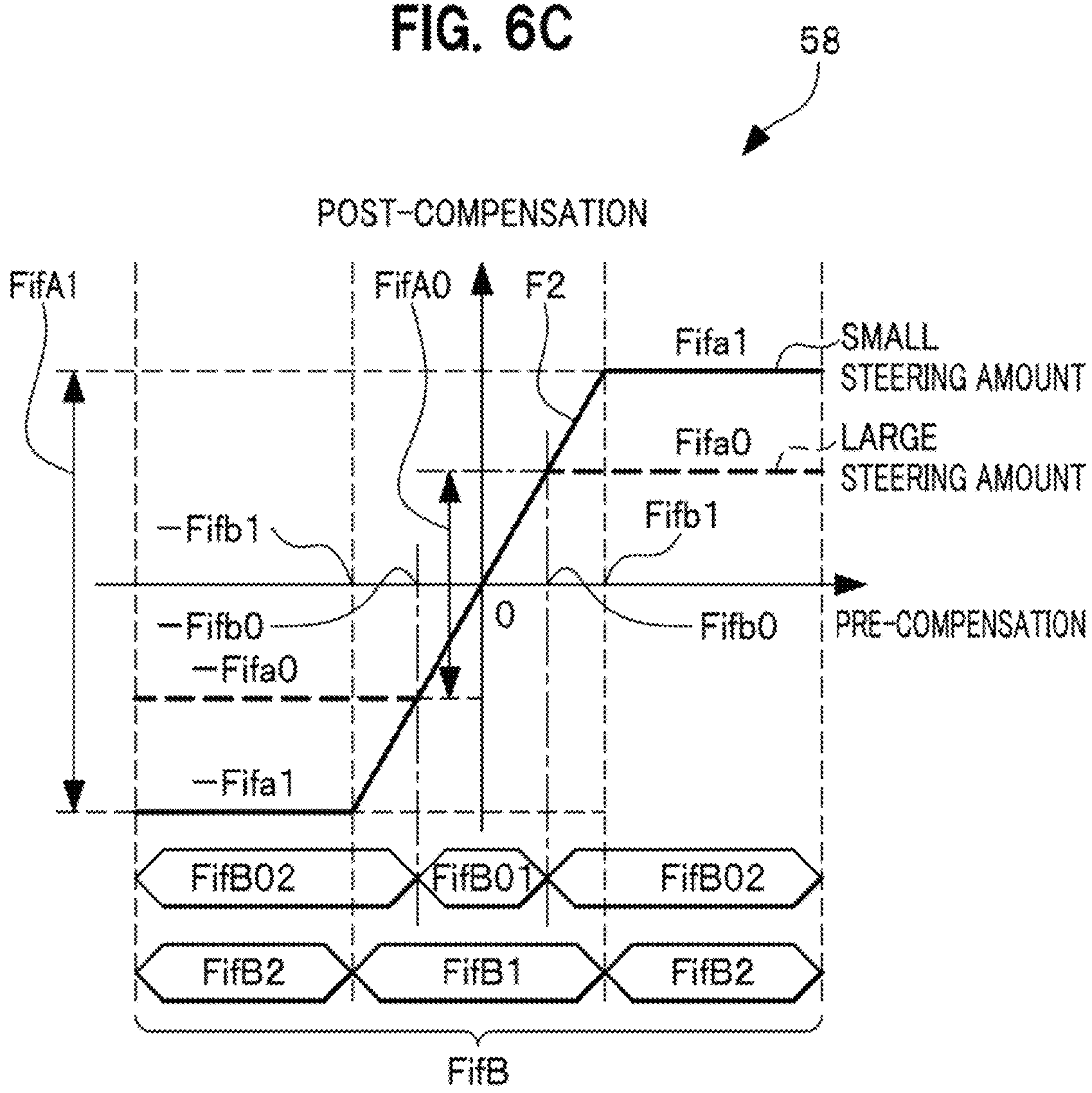
FIG. 6C is a diagram explaining a pre-post-compensation equivalent friction compensation force map according to a second modification, in which an equivalent friction compensation force is corrected based on steering information.

FIG. 6C is a diagram explaining a pre-post-compensation equivalent friction compensation force map 58 according to the second modification, in which the equivalent friction compensation force Fif is corrected based on steering information (magnitude of the steering amount).

The electrically powered suspension system 11 according to the second modification including the damping force calculation unit 45B according to the second modification is different from the electrically powered suspension system 11 according to the first modification including the damping force calculation unit 45B according to the first modification in that the equivalent friction compensation force Fif is corrected based on the steering information (magnitude of the steering amount).

To be more specific, as seen in FIG. 6C, a plurality of different equivalent friction compensation force characteristics are set in the pre-post-compensation equivalent friction compensation force map 58 according to the second modification that is included in the equivalent friction compensation force calculation unit 57 according to the second modification.

A plurality of systems (see FIG. 6C) set in the pre-post-compensation equivalent friction compensation force map 58 according to the second modification are compatible with the plurality of systems (see FIG. 6B) set in the pre-post-compensation equivalent friction compensation force map 58 according to the first modification, and consists of two systems including a system corresponding to a small steering amount and a system corresponding to a large steering amount.

The equivalent friction compensation force calculation unit 57 according to the second modification switches between the two systems of equivalent friction compensation force characteristics for correction, among the plurality different systems of equivalent friction compensation force characteristics set in the pre-post-compensation equivalent friction compensation force map 58 according to the second modification, in accordance with the steering information (magnitude of the steering amount) acquired by the information acquisition unit 43 such that if the steering amount is small, the equivalent friction compensation force characteristic of the system corresponding to the small steering amount is used, whereas if the steering amount is large, the equivalent friction compensation force characteristic of the system corresponding to the large steering amount is used.

The adhesion of tires is low when the steering amount is large than when the steering amount is small. For this reason, it is required in the case of the large steering amount (than in the case of the small steering amount) to ensure the adhesion of a tire, that is, to achieve a high level of steering stability, by sufficiently converging a violent fluctuation of the stroke velocity SV when the electrically powered suspension system 11 performs a damping control.

As described previously, smaller in the value of the post-compensation equivalent friction compensation force Fif is better to achieve the effect of ensuring a high level of steering stability by the damping control.

Therefore, as shown in FIG. 6C, when the steering amount is large, the equivalent friction compensation force calculation unit 57 according to the second modification performs a correction by switching to the equivalent friction compensation force characteristic in which the equivalent friction compensation force Fif becomes smaller as compared with the case where the steering amount is small.

To be more specific, when calculating the equivalent friction compensation force Fif, the equivalent friction compensation force calculation unit 57 according to the second modification adjusts at least one of the elastic force component Fef and the dynamic friction force component Fcf based on the steering information (magnitude of the steering amount), and performs a correction for the equivalent friction compensation force Fif based on the result of this adjustment.

As a result, as shown in FIG. 6C, the equivalent friction compensation force calculation unit 57 according to the second modification selects and uses the equivalent friction compensation force characteristic related to the system corresponding to the small steering amount (having a characteristic that the value of the post-compensation equivalent friction compensation force Fif is relatively large) when the steering amount is small. On the contrary, the equivalent friction compensation force calculation unit 57 according to the second modification selects and uses the equivalent friction compensation force characteristic related to the system corresponding to the large steering amount (having a characteristic that the value of the post-compensation equivalent friction compensation force Fif is relatively small) when the steering amount is large.

Consequently, the amount of damping control in the electrically powered suspension system 11 increases when the steering amount is large than when the steering amount is small.

Therefore, it is possible to achieve the effect of ensuring a high level of steering stability by the damping control even when the steering amount is large.

<Equivalent Friction Compensation Force Map 58 According to the Third Modification>

Next, with reference to FIG. 6D, a description will be given to an equivalent friction compensation force map 58 according to the third modification that is included in the equivalent friction compensation force calculation unit 57 of the damping force calculation unit 45B according to the third modification.

Figure 6D:
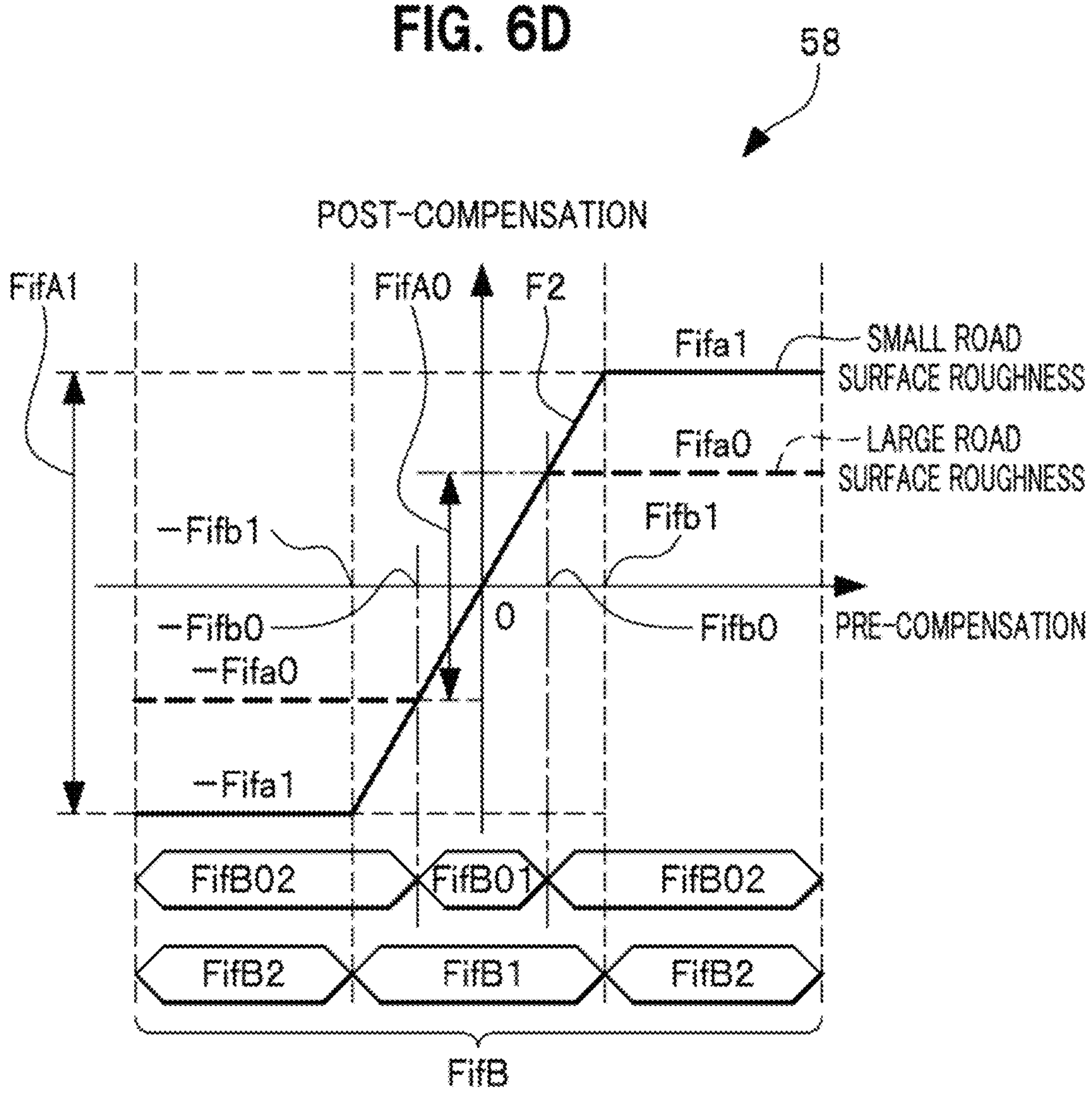
FIG. 6D is a diagram explaining a pre-post-compensation equivalent friction compensation force map according to a third modification, in which an equivalent friction compensation force is corrected based on traveling road surface information.

FIG. 6D is a diagram explaining a pre-post-compensation equivalent friction compensation force map 58 according to the third modification, in which the equivalent friction compensation force Fif is corrected based on traveling road surface information (extent of the road surface roughness).

The electrically powered suspension system 11 according to the third modification including the damping force calculation unit 45B according to the third modification is different from the electrically powered suspension system 11 according to the first and second modifications including the damping force calculation unit 45B according to the first and second modifications in that the equivalent friction compensation force Fif is corrected based on the traveling road surface information (extent of the road surface roughness).

To be more specific, as seen in FIG. 6D, a plurality of different equivalent friction compensation force characteristics are set in the pre-post-compensation equivalent friction compensation force map 58 according to the third modification that is included in the equivalent friction compensation force calculation unit 57 according to the third modification.

A plurality of systems (see FIG. 6D) set in the pre-post-compensation equivalent friction compensation force map 58 according to the third modification are compatible with the plurality of systems (see FIGS. 6B and 6C) set in the pre-post-compensation equivalent friction compensation force map 58 according to the first and second modifications, and consists of two systems including a system corresponding to a small road surface roughness and a system corresponding to a large road surface roughness.

The equivalent friction compensation force calculation unit 57 according to the third modification switches between the two systems of equivalent friction compensation force characteristics for correction, among the plurality different systems of equivalent friction compensation force characteristics set in the pre-post-compensation equivalent friction compensation force map 58 according to the third modification, in accordance with the traveling road surface information (extent of the road surface roughness) acquired by the information acquisition unit 43 such that if the road surface roughness is small, the equivalent friction compensation force characteristic of the system corresponding to the small road surface roughness is used, whereas if the road surface roughness is large, the equivalent friction compensation force characteristic of the system corresponding to the large road surface roughness is used.

The adhesion of tires is low when the vehicle travels on a road having a large surface roughness than when travels on a road having a small surface roughness. For this reason, it is required in the case of the large road surface roughness (than in the case of the small road surface roughness) to ensure the adhesion of a tire, that is, to achieve a high level of steering stability, by sufficiently converging a violent fluctuation of the stroke velocity SV when the electrically powered suspension system 11 performs a damping control.

As described previously, smaller in the value of the post-compensation equivalent friction compensation force Fif is better to achieve the effect of ensuring a high level of steering stability by the damping control.

Therefore, as shown in FIG. 6D, in the case of the large road surface roughness, the equivalent friction compensation force calculation unit 57 according to the third modification performs a correction by switching to the equivalent friction compensation force characteristic in which the equivalent friction compensation force Fif becomes smaller as compared with the case of the small road surface roughness.

To be more specific, when calculating the equivalent friction compensation force Fif, the equivalent friction compensation force calculation unit 57 according to the third modification adjusts at least one of the elastic force component Fef and the dynamic friction force component Fcf based on the traveling road surface information (extent of the road surface roughness), and performs a correction for the equivalent friction compensation force Fif based on the result of this adjustment.

As a result, as shown in FIG. 6D, the equivalent friction compensation force calculation unit 57 according to the third modification selects and uses the equivalent friction compensation force characteristic related to the system corresponding to the small road surface roughness (having a characteristic that the value of the post-compensation equivalent friction compensation force Fif is relatively large) when the vehicle travels on a road surface having a small road surface roughness. On the contrary, the equivalent friction compensation force calculation unit 57 according to the third modification selects and uses the equivalent friction compensation force characteristic related to the system corresponding to the large road surface roughness (having a characteristic that the value of the post-compensation equivalent friction compensation force Fif is relatively small) when the vehicle travels on a road surface having a large road surface roughness.

Consequently, the amount of damping control in the electrically powered suspension system 11 increases when the vehicle travels on a road surface having a large road surface roughness than when travels on a road surface having a small road surface roughness.

Therefore, it is possible to achieve the effect of ensuring a high level of steering stability by the damping control even when the vehicle travels on a road surface having a large road surface roughness.

<Equivalent Friction Compensation Force Map 58 According to the Fourth Modification>

Next, with reference to FIG. 6E, a description will be given to an equivalent friction compensation force map 58 according to the fourth modification that is included in the equivalent friction compensation force calculation unit 57 of the damping force calculation unit 45B according to the fourth modification.

Figure 6E:
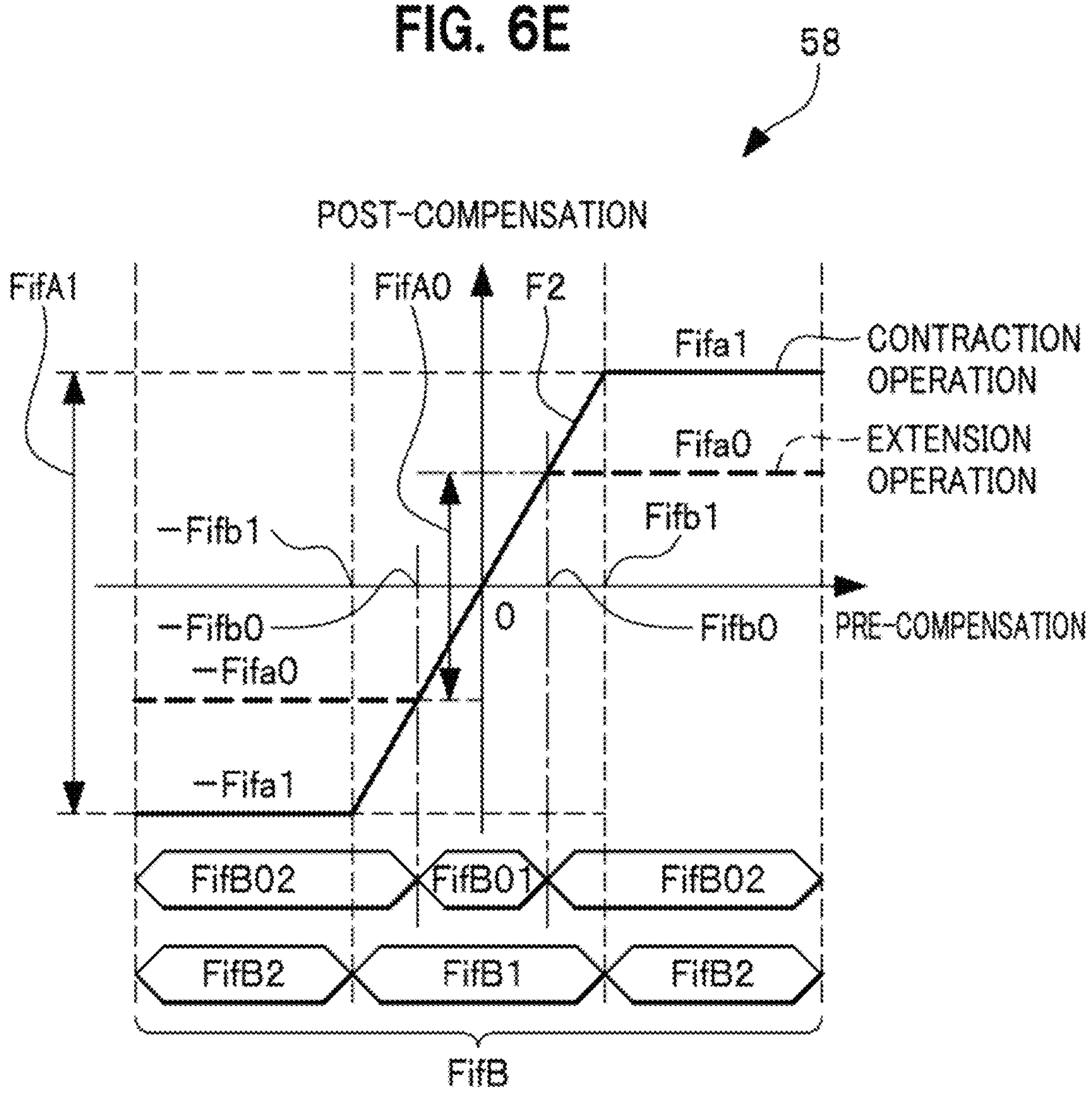
FIG. 6E is a diagram explaining a pre-post-compensation equivalent friction compensation force map according to a fourth modification, in which an equivalent friction compensation force is corrected based on information on an operational condition of the electromagnetic actuator.

FIG. 6E is a diagram explaining a pre-post-compensation equivalent friction compensation force map 58 according to the fourth modification, in which the equivalent friction compensation force Fif is corrected based on information on the operational condition of the electromagnetic actuator 13 that is information as to whether the electromagnetic actuator 13 extends (extension operation) or contacts (contraction operation).

The electrically powered suspension system 11 according to the fourth modification including the damping force calculation unit 45B according to the fourth modification is different from the electrically powered suspension system 11 according to the first to third modifications including the damping force calculation unit 45B according to the first to third modifications in that the equivalent friction compensation force Fif is corrected based on the information on the operational condition of the electromagnetic actuator 13 related to the extension operation or the contraction operation.

To be more specific, as seen in FIG. 6E, a plurality of different equivalent friction compensation force characteristics are set in the pre-post-compensation equivalent friction compensation force map 58 according to the fourth modification that is included in the equivalent friction compensation force calculation unit 57 according to the fourth modification.

A plurality of systems (see FIG. 6E) set in the pre-post-compensation equivalent friction compensation force map 58 according to the fourth modification are compatible with the plurality of systems (see FIGS. 6B to 6D) set in the pre-post-compensation equivalent friction compensation force map 58 according to the first to third modifications, and consists of two systems including a system corresponding to the extension operation and a system corresponding to the contraction operation.

The equivalent friction compensation force calculation unit 57 according to the fourth modification switches between the two systems of equivalent friction compensation force characteristics for correction, among the plurality different systems of equivalent friction compensation force characteristics set in the pre-post-compensation equivalent friction compensation force map 58 according to the fourth modification, in accordance with the information on the operational condition of the electromagnetic actuator 13 (the extension operation or the contraction operation) acquired by the information acquisition unit 43 such that when the electromagnetic actuator 13 extends (in the extension operation), the equivalent friction compensation force characteristic of the system corresponding to the extension operation is used, whereas when the electromagnetic actuator 13 contracts (in the contraction operation), the equivalent friction compensation force characteristic of the system corresponding to the contraction operation is used.

The riding comfort of the vehicle 10 is worse during the contraction operation of the electromagnetic actuator 13 than during the extension operation of the electromagnetic actuator 13. For this reason, it is required, during the contraction operation of the electromagnetic actuator 13 (than during the extension operation of the electromagnetic actuator 13), to ensure the degree of freedom of the stroke, that is, to achieve a high level of improved riding comfort when the electrically powered suspension system 11 performs a damping control.

As described previously, smaller in the value of the post-compensation equivalent friction compensation force Fif is better to achieve the effect of ensuring a high level of improved riding comfort by the damping control.

Therefore, as shown in FIG. 6E, in the case of the contraction operation of the electromagnetic actuator 13, the equivalent friction compensation force calculation unit 57 according to the fourth modification performs a correction by switching to the equivalent friction compensation force characteristic in which the equivalent friction compensation force Fif becomes larger as compared with the case of the extension operation of the electromagnetic actuator 13.

To be more specific, when calculating the equivalent friction compensation force Fif, the equivalent friction compensation force calculation unit 57 according to the fourth modification adjusts at least one of the elastic force component Fef and the dynamic friction force component Fcf based on the information on the operational condition of the electromagnetic actuator 13 (the extension operation or the contraction operation), and performs a correction for the equivalent friction compensation force Fif based on the result of this adjustment.

As a result, as shown in FIG. 6E, the equivalent friction compensation force calculation unit 57 according to the fourth modification selects and uses the equivalent friction compensation force characteristic related to the system corresponding to the extension operation (having a characteristic that the value of the post-compensation equivalent friction compensation force Fif is relatively small) during the extension operation of the electromagnetic actuator 13. On the contrary, the equivalent friction compensation force calculation unit 57 according to the fourth modification selects and uses the equivalent friction compensation force characteristic related to the system corresponding to the contraction operation (having a characteristic that the value of the post-compensation equivalent friction compensation force Fif is relatively large) during the contraction operation of the electromagnetic actuator 13.

Consequently, the amount of damping control in the electrically powered suspension system 11 increases during the contraction operation of the electromagnetic actuator 13 than during the extension operation of the electromagnetic actuator 13.

Therefore, it is possible to achieve the effect of ensuring a high level of improved riding comfort of the vehicle 10 during the contraction operation of the electromagnetic actuator 13.

<Comparison Between the Electrically Powered Suspension System 11 According to the Embodiment and the Electrically Powered Suspension System 11 According to a Comparative Example>

With reference to FIGS. 7A, 7B, 8A and 8B, the electrically powered suspension system 11 according to the embodiment of the present invention will be described in contradistinction to an electrically powered suspension system 11 according to a comparative example.

Figure 7A:
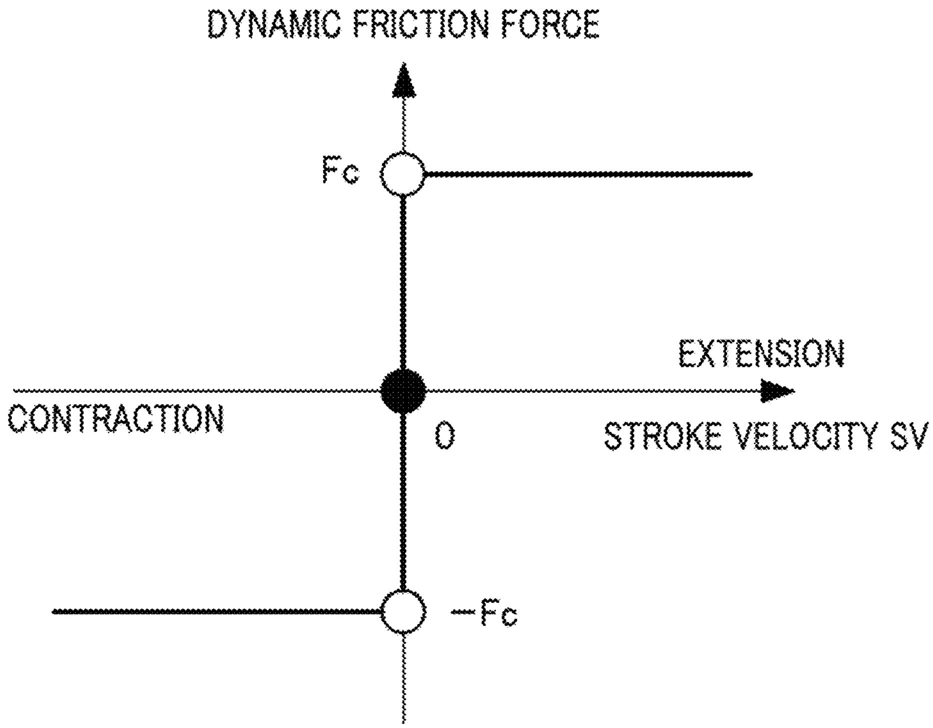
FIG. 7A is a schematic diagram conceptually illustrating a relationship between a change in a stroke velocity and a dynamic friction force generated in a mechanism portion of an electrically powered suspension system according to a comparative example.
Figure 7B:
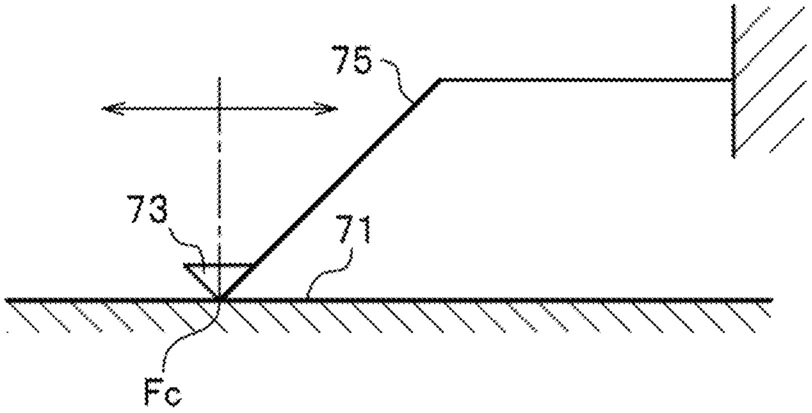
FIG. 7B is a schematic diagram conceptually modeling a state in which a dynamic friction force is generated in the mechanism portion of the electrically powered suspension system according to the comparative example.
Figure 8A:
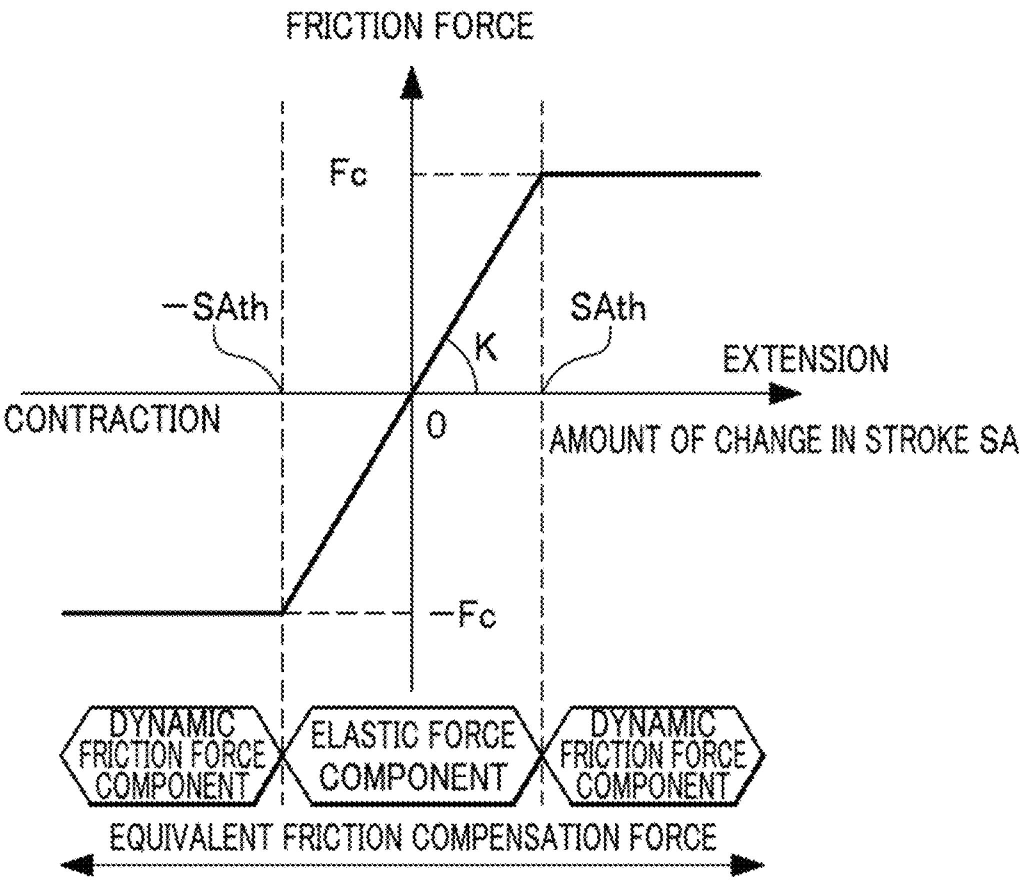
FIG. 8A is a diagram conceptually illustrating a relationship between an amount of change in a stroke and an equivalent friction force generated in a mechanism portion of the electrically powered suspension system according to this embodiment.
Figure 8B:
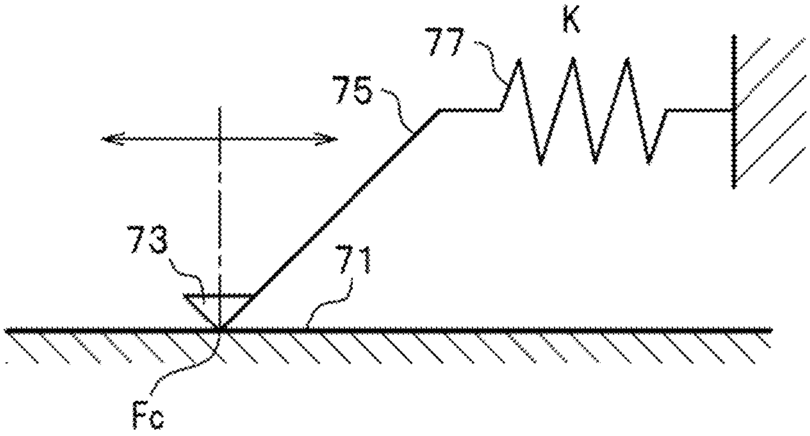
FIG. 8B is a schematic diagram conceptually modeling a state in which an equivalent friction force is generated in the mechanism portion of the electrically powered suspension system according to this embodiment.

FIG. 7A is a schematic diagram conceptually illustrating a relationship between a change in a stroke velocity SV and a dynamic friction force generated in a mechanism portion of an electrically powered suspension system 11 according to a comparative example. FIG. 7B is a schematic diagram conceptually modeling a state in which a dynamic friction force is generated in the mechanism portion of the electrically powered suspension system 11 according to the comparative example. FIG. 8A is a diagram conceptually illustrating a relationship between the amount of change in a stroke ΔSA and an equivalent friction force generated in the mechanism portion of the electrically powered suspension system 11 according to the embodiment. FIG. 8B is a schematic diagram conceptually modeling a state in which an equivalent friction force is generated in the mechanism portion of the electrically powered suspension system 11 according to the embodiment.

With reference to FIGS. 7A and 7B, a description will be given to the relationship between a change in the stroke velocity SV and the dynamic friction force generated in the mechanism portion of the electrically powered suspension system 11 according to the comparative example.

As seen in FIG. 7B, a model representing the mechanism portion of the electrically powered suspension system 11 according to the comparative example shows that a contact portion 73 in contact with a contact surface 71 is moved along the contact surface 71 via an arm portion 75. It should be noted that a load applied to the contact surface 71 from the contact portion 73 is constant in this model of the comparative example.

As seen in FIG. 7A, in the model representing the mechanism portion of the electrically powered suspension system 11 according to the comparative example, the dynamic friction force is zero when the stroke velocity SV of the electromagnetic actuator 13 in its extension/contraction direction is zero.

For example, if a driving force is applied to the electromagnetic actuator 13 and the stroke velocity SV in an extension direction exceeds zero, the dynamic friction force instantly and abruptly increases to a positive saturated friction force Fc.

In contrast, if the stroke velocity SV in a contraction direction exceeds zero, the dynamic friction force instantly and abruptly decreases to a negative saturated friction force −Fc.

This means that a sudden change of the dynamic friction force (2Fc) occurs when the stroke direction of the electromagnetic actuator 13 is reversed. The electrically powered suspension system 11 according to the comparative example is likely to generate an unusual noise around the mechanism portion of the electromagnetic actuator 13 due to this sudden change of the dynamic friction force (2Fc).

In particular, if the electrically powered suspension system 11 is mounted on a relatively heavy vehicle, an effect of a friction force generated in the electromagnetic actuator becomes relatively large. As a result, an unusual noise generated around the mechanism portion of the electromagnetic actuator 13 becomes more pronounced.

In contrast, as shown in FIG. 8B, the model representing the mechanism portion of the electrically powered suspension system 11 according to the embodiment shows that a contact portion 73 in contact with a contact surface 71 is moved along the contact surface 71 via an arm portion 75 and an elastic member 77. It should be noted that the elastic member 77 has an elastic modulus K (unit: N/m). Further, as with the model in the comparative example, a load applied to the contact surface 71 from the contact portion 73 is constant in the model according to the embodiment.

The model according to the embodiment is different from the model according to the comparative example in that the contact portion 73 is moved along the contact surface 71 via the elastic member 77. Therefore, in the model according to the embodiment, even if the amount of change in the stroke ΔSA in the extension/contraction direction exceeds zero, the friction force increases or decreases gently in a predetermined region (−SAth≤SA≤SAth), thanks to the presence of the elastic member 77, according to the predetermined liner function F1 (F1=K×SA; where K is the elastic modulus).

According to the present invention, the friction force generated in the predetermined region and having a linear characteristic is referred to as an elastic force component.

As shown in FIG. 8A, in the model representing the mechanism portion of the electrically powered suspension system 11 according to the embodiment, the friction force is zero when the amount of change in the stroke velocity ΔSA of the electromagnetic actuator 13 in its extension/contraction direction is zero. The same holds true for the comparative example.

For example, if the amount of change in the stroke ΔSA of the electromagnetic actuator 13 in the extension direction is in a predetermined region exceeding zero but lower than the positive saturated threshold value SAth, the elastic force component increases gradually, until reaching the positive saturated friction force Fc, according to the predetermined liner function F1 (F1=K×SA).

On the contrary, if the amount of change in the stroke ΔSA of the electromagnetic actuator 13 in the contraction direction is in a predetermined region lower than zero and exceeding the negative saturated threshold value −SAth, the elastic force component decreases gradually, until reaching the negative saturated friction force −Fc, according to the predetermined linear function F 1.

Further, if the amount of change in the stroke ΔSA of the electromagnetic actuator 13 in the extension direction is in a region outside the predetermined region in excess of the positive saturated threshold value SAth, the dynamic friction force component takes the positive saturated friction force Fc that is a fixed value.

On the contrary, if the amount of change in the stroke ΔSA of the electromagnetic actuator 13 in the contraction direction is in a region outside the predetermined region and lower than the negative saturated threshold valued −SAth, the dynamic friction force component takes the negative saturated friction force −Fc that is a fixed value.

In other words, according to the electrically powered suspension system 11 according to the embodiment of the present invention, the elastic force component increases or decreases gradually according to the predetermined linear function F 1 in the case where the amount of change in the stroke ΔSA of the electromagnetic actuator 13 is converged in the predetermined region (−SAth≤ΔSA≤SAth). Herein, "in the case where the amount of change in the stroke ΔSA of the electromagnetic actuator 13 is converged in the predetermined region" includes the case where the stroke direction of the electromagnetic actuator 13 is reversed.

This means that when the stroke direction of the electromagnetic actuator 13 is reversed, the elastic force component at this point of time can be increased or decreased gradually according to the predetermined linear function F 1.

Further, in the case where the amount of change in the stroke ΔSA of the electromagnetic actuator 13 is in a region outside the predetermined region, the dynamic friction force component takes the positive saturated friction force Fc or the negative saturated friction force −Fc that is a fixed value. Herein, it is assumed that "in the case where the amount of change in the stroke ΔSA of the electromagnetic actuator 13 is in a region outside the predetermined region" corresponds to the case where the operational condition of the electromagnetic actuator 13 is not an operational condition thereof involving the reversing of the stroke direction that may possibly cause an unusual noise but an operation condition thereof involving a change in the amount of stroke exceeding a predetermined value.

In such cases, the electrically powered suspension system 11 according to the embodiment limits the magnitude of the dynamic friction force component to the positive or negative saturated friction force Fc, −Fc that is a fixed value.

<Operation and Effects of the Electrically Powered Suspension System 11 According to the Embodiment and Modifications>

The electrically powered suspension system 11 according to a first aspect includes: the electromagnetic actuator 13 disposed in parallel with a spring member installed between the vehicle body and a wheel of the vehicle 10 and configured to generate a driving force related to vibration damping of the vehicle 10; the information acquisition unit 43 configured to acquire time-series information related to a stroke position of the electromagnetic actuator 13, information on a stroke velocity SV, and the amount of change in the stroke ΔSA of the electromagnetic actuator 13 and information on the stroke direction based on the time-series information related to the stroke position; the damping force calculation unit 45 configured to calculate the target damping force that is the target value of the damping operation of the electromagnetic actuator 13 based on the information on the stroke velocity SV acquired by the information acquisition unit 43; and the drive control unit 49 configured to control driving of the electromagnetic actuator 13 using the target driving force obtained based on the target damping force calculated by the damping force calculation unit 45.

The damping force calculation unit 45 calculates the equivalent friction compensation force Fif in relation to the electromagnetic actuator 13 based on the amount of change in the stroke ΔSA and the information on the stroke direction acquired by the information acquisition unit 43, and corrects the target damping force based on the calculated equivalent friction compensation force Fif.

The equivalent friction compensation force Fif consists of the elastic force component Fef and the dynamic friction force component Fcf.

The damping force calculation unit 45 of the electrically powered suspension system 11 according to the first aspect operates: to calculate the equivalent friction compensation force Fif (consisting of the elastic force component Fef and the dynamic friction force component Fcf) in relation to the electromagnetic actuator 13 based on the amount of change in the stroke ΔSA and the information on the stroke direction; and subsequently to correct the target damping force based on the calculated equivalent friction compensation force Fif.

Suppose that an electrically powered suspension system according to the comparative example (see FIGS. 7A and 7B) operates: to calculate a friction compensation force (without reflecting the elastic force component) based on the dynamic friction force component only; and subsequently to correct the target damping force based on the calculated friction compensation force. The electrically powered suspension system 11 according to the first aspect will be compared with the electrically powered suspension system according to the comparative example to study and evaluate operational effects.

The electrically powered suspension system according to the comparative example calculates the friction compensation force based on the dynamic friction force component only. Accordingly, as seen in FIG. 7A, if a driving force is applied to the electromagnetic actuator 13 and the stroke velocity SV of the electromagnetic actuator 13 in the extension direction exceeds zero, the dynamic friction force instantly and abruptly increases to the positive saturated friction force Fc.

On the contrary, if the stroke velocity SV of the electromagnetic actuator 13 in the contraction direction exceeds zero, the dynamic friction force instantly and abruptly decreases to the negative saturated friction force −Fc.

This means that a sudden change of the dynamic friction force (2Fc: see FIG. 7A) occurs when the stroke direction of the electromagnetic actuator 13 is reversed.

Because of this abrupt change in the dynamic friction force (2Fc), the electrically powered suspension system according to the comparative example may have a problem in that hunting occurs and the control state becomes unstable if the gain of the friction control is high. This may result in decreased riding comfort due to discontinuous control force and in an unusual noise generated around the mechanism portion of the electromagnetic actuator 13 due to torque ripple generated when the stroke direction of the electromagnetic actuator 13 is reversed.

In this regard, the electrically powered suspension system 11 according to the first aspect operates to correct the target damping force (target control force) for the friction generated around the mechanism portion of the electromagnetic actuator 13 and having the magnitude and the operating direction changing from time to time, in order to reflect the elastic force component Fef in particular from the view point of elastic friction. Therefore, it is possible to ensure an equivalent friction compensation force having an appropriate magnitude and to suppress an unusual noise generated around the mechanism portion of the electromagnetic actuator 13 at a time when the stroke direction of the electromagnetic actuator 13 is reversed.

Further, the electrically powered suspension system 11 according to the first aspect can provide a stable control state regardless of whether the gain of the friction control is high or low and improve the riding comfort based on continuous control force.

The electrically powered suspension system 11 according to a second aspect is configured, in addition to the aspect of the electrically powered suspension system 11 according to the first aspect, such that the damping force calculation unit 45 operates: to calculate the elastic force component Fef by multiplying the amount of change in the stroke ΔSA by a predetermined coefficient K based on the amount of change in the stroke ΔSA and the information on the stroke direction acquired by the information acquisition unit 43, and to calculate the equivalent friction compensation force Fif based on the calculated elastic force component Fef and the dynamic friction force component Fcf; and subsequently to correct the target damping force based on the calculated equivalent friction compensation force Fif.

The electrically powered suspension system 11 according to the second aspect corrects the target damping force, for example, by subtracting the equivalent friction compensation force Fif from the target damping force (i.e., excluding the influence of the equivalent friction force from the target damping force) based on a procedure for calculating the elastic force component Fef and the equivalent friction compensation force Fif and based on the equivalent friction compensation force Fif, so that the configuration for implementing the electrically powered suspension system 11 according to the present invention can be clearly defined. Therefore, the advantageous effect of the electrically powered suspension system 11 according to the first aspect can be further improved.

The electrically powered suspension system 11 according to a third aspect may be configured, in addition to the aspect of the electrically powered suspension system 11 according to the first aspect or the second aspect, such that the elastic force component Fef has a characteristic (see FIG. 8A) to increase and decrease in accordance with a change in the amount of change in the stroke ΔSA if the amount of change in the stroke ΔSA converges to a predetermined region including zero, and that the dynamic friction force component Fcf has a characteristic (see FIG. 8A) to take the predetermined value irrespective of a change in the amount of change in the stroke ΔSA if the amount of change in the stroke ΔSA is present in a region outside the predetermined region.

The electrically powered suspension system 11 according to the third aspect clearly defines the characteristic based on a change in the amount of change in the stroke ΔSA that is included in each of the elastic force component Fef and the dynamic friction force component Fcf that are components of the equivalent friction compensation force Fif. Therefore, the advantageous effect of the electrically powered suspension system 11 according to the second aspect can be further improved.

The electrically powered suspension system 11 according to a fourth aspect may be configured, in addition to the aspect of the electrically powered suspension system 11 according to any one of the first to third aspects, such that the information acquisition unit 43 acquires information on the vehicle speed, and that the damping force calculation unit 45 adjusts, when calculating the equivalent friction compensation force Fif, at least one of the elastic force component Fef and the dynamic friction force component Fcf based on the information on the vehicle speed acquired by the information acquisition unit 43, and then corrects the equivalent friction compensation force Fif based on the result of this adjustment.

The damping force calculation unit 45 of the electrically powered suspension system 11 according to the fourth aspect adjusts, when calculating the equivalent friction compensation force Fif, at least one of the elastic force component Fef and the dynamic friction force component Fcf based on the information on the vehicle speed acquired by the information acquisition unit 43, and then corrects the equivalent friction compensation force Fif based on the result of this adjustment.

It should be noted that the electrically powered suspension system 11 according to the first modification corresponds to the electrically powered suspension system 11 according to the fourth aspect.

To be more specific, the value of the elastic force component Fef is adjusted so that when the vehicle speed is low (in a low vehicle speed region) for instance, the value of the elastic force component Fef is relatively large. This can relatively increase the value of the equivalent friction compensation force Fif. Accordingly, the target damping force is corrected to a relatively small value. This makes it possible to improve riding comfort with respect to the stability of the vehicle behavior (steering stability).

Meanwhile, when the vehicle speed is high (in a high vehicle speed region), the value of the elastic force component Fef is adjusted to be relatively small. This can relatively decrease the value of the equivalent friction compensation force Fif. Accordingly, the target damping force is corrected to a relatively large value. This makes it possible to enhance the adhesion of a tire with respect to improvement in the riding comfort to stabilize the vehicle behavior (to improve the steering stability).

The electrically powered suspension system 11 according to the fourth aspect can properly correct the target damping force by adjusting at least one of the elastic force component Fef and the dynamic friction force component Fcf in accordance with the vehicle speed (high vehicle speed or low vehicle speed). Therefore, a fine adjustment can be made for the priority between the improved riding comfort and the stability of the vehicle behavior (steering stability).

The electrically powered suspension system 11 according to a fifth aspect may be configured, in addition to the aspect of the electrically powered suspension system 11 according to any one of the first to third aspects, such that the information acquisition unit 43 acquires steering information related to steering of the vehicle 10, and that the damping force calculation unit 45 adjusts, when calculating the equivalent friction compensation force Fif, at least one of the elastic force component Fef and the dynamic friction force component Fcf based on the steering information acquired by the information acquisition unit 43, and then corrects the equivalent friction compensation force Fif based on the result of this adjustment.

The damping force calculation unit 45 of the electrically powered suspension system 11 according to the fifth aspect adjusts, when calculating the equivalent friction compensation force Fif, at least one of the elastic force component Fef and the dynamic friction force component Fcf based on the steering information acquired by the information acquisition unit 43, and then corrects the equivalent friction compensation force Fif based on the result of this adjustment.

It should be noted that the electrically powered suspension system 11 according to the second modification corresponds to the electrically powered suspension system 11 according to the fifth aspect.

To be more specific, the value of the elastic force component Fef is adjusted so that when the steering information indicating that the vehicle 10 is traveling on a straight road (small steering amount) for instance is received, the value of the elastic force component Fef is relatively large. This can relatively increase the value of the equivalent friction compensation force Fif. Accordingly, the target damping force is corrected to a relatively small value. This makes it possible to improve riding comfort with respect to the stability of the vehicle behavior (steering stability).

Meanwhile, when the steering information indicating that the vehicle 10 is traveling on a winding road (large steering amount) is received, the value of the elastic force component Fef is adjusted to be relatively small. This can relatively decrease the value of the equivalent friction compensation force Fif. Accordingly, the target damping force is corrected to a relatively large value. This makes it possible to enhance the adhesion of a tire with respect to improvement in the riding comfort to stabilize the vehicle behavior (to improve the steering stability).

It should be noted that information such as a yaw rate, a lateral acceleration of the vehicle 10, a steering angle, a steering angular velocity, and a steering torque signal of the electric power steering may be used where appropriate as the steering information of the present invention.

The electrically powered suspension system 11 according to the fifth aspect can properly correct the target damping force by adjusting at least one of the elastic force component Fef and the dynamic friction force component Fcf in accordance with the steering information (large steering amount or small steering amount). Therefore, a fine adjustment can be made for the priority between the improved riding comfort and the stability of the vehicle behavior (steering stability).

The electrically powered suspension system 11 according to a sixth aspect may be configured, in addition to the aspect of the electrically powered suspension system 11 according to any one of the first to third aspects, such that the information acquisition unit 43 acquires traveling road surface information (information on a road surface on which the vehicle 10 is traveling), and that the damping force calculation unit 45 adjusts, when calculating the equivalent friction compensation force Fif, at least one of the elastic force component Fef and the dynamic friction force component Fcf based on the traveling road surface information acquired by the information acquisition unit 43, and then corrects the equivalent friction compensation force Fif based on the result of this adjustment.

The damping force calculation unit 45 of the electrically powered suspension system 11 according to the sixth aspect adjusts, when calculating the equivalent friction compensation force Fif, at least one of the elastic force component Fef and the dynamic friction force component Fcf based on the traveling road surface information acquired by the information acquisition unit 43, and then corrects the equivalent friction compensation force Fif based on the result of this adjustment.

It should be noted that the electrically powered suspension system 11 according to the third modification corresponds to the electrically powered suspension system 11 according to the sixth aspect.

To be more specific, the value of the elastic force component Fef is adjusted so that when the traveling road surface information indicating that the vehicle 10 is traveling on a well-maintained road surface (small road surface roughness) for instance is received, the value of the elastic force component Fef is relatively large. This can relatively increase the value of the equivalent friction compensation force Fif. Accordingly, the target damping force is corrected to a relatively small value. This makes it possible to improve riding comfort with respect to the stability of the vehicle behavior (steering stability).

Meanwhile, the traveling road surface information indicating that the vehicle 10 is traveling on a poorly maintained road surface (large road surface roughness) is received, the value of the elastic force component Fef is adjusted to be relatively small. This can relatively decrease the value of the equivalent friction compensation force Fif. Accordingly, the target damping force is corrected to a relatively large value. This makes it possible to enhance the adhesion of a tire with respect to improvement in the riding comfort to stabilize the vehicle behavior (to improve the steering stability).

It should be noted that information such as map information of a navigation device, information from an external sensor, traveling history data may be used where appropriate as the traveling road surface information.

The electrically powered suspension system 11 according to the sixth aspect can properly correct the target damping force by adjusting at least one of the elastic force component Fef and the dynamic friction force component Fcf in accordance with the traveling road surface information related to the road surface on which the vehicle 10 is traveling. Therefore, a fine adjustment can be made for the priority between the improved riding comfort and the stability of the vehicle behavior (steering stability).

The electrically powered suspension system 11 according to a seventh aspect may be configured, in addition to the aspect of the electrically powered suspension system 11 according to any one of the first to third aspects, such that the damping force calculation unit 45 determines, when calculating the equivalent friction compensation force Fif, information on the operational condition of the electromagnetic actuator 13 as to whether the electromagnetic actuator 13 extends or contracts based on the information on the stroke direction acquired by the information acquisition unit 43, and then sets the equivalent friction compensation force based on the determined information on the operational condition of the electromagnetic actuator 13 such that the equivalent friction compensation force corresponding to the extension operation of the electromagnetic actuator 13 and the equivalent friction compensation force corresponding to the contraction operation of the electromagnetic actuator 13 have different characteristics to each other.

The damping force calculation unit 45 of the electrically powered suspension system 11 according to the seventh aspect sets, based on the information on the operational condition of the electromagnetic actuator 13, the equivalent friction compensation force corresponding to the extension operation of the electromagnetic actuator 13 and the equivalent friction compensation force corresponding to the contraction operation of the electromagnetic actuator 13 to have different characteristics to each other (see FIG. 6E).

It should be noted that the electrically powered suspension system 11 according to the fourth modification corresponds to the electrically powered suspension system 11 according to the seventh aspect.

The damping force calculation unit 45 of the electrically powered suspension system 11 according to the seventh aspect sets, based on the information on the operational condition of the electromagnetic actuator 13, the equivalent friction compensation force corresponding to the extension operation of the electromagnetic actuator 13 and the equivalent friction compensation force corresponding to the contraction operation of the electromagnetic actuator 13 to have different characteristics to each other. Therefore, it is possible to achieve the effect of ensuring a high level of improved riding comfort of the vehicle 10 during the contraction operation of the electromagnetic actuator 13.

Other Embodiments

The embodiment and the plurality of modifications described above are examples of implementations of the present invention. Therefore, the technical scope of the present invention should not be construed in a limited manner by these embodiment and modifications. The present invention can be implemented in various forms without departing from the gist or the main scope of the present invention.

For example, the electrically powered suspension system 11 according to the modifications have been described such that the value of the elastic force component Fef is adjusted based on either one of the vehicle speed, the steering information, and the traveling road surface information. However, the present invention is not limited to this specific embodiment.

The present invention may be implemented such that the value of the elastic force component Fef is adjusted based on a combination of two or more of the vehicle speeds, the steering information, and the traveling road surface information.

Further, the electrically powered suspension system 11 according to the embodiment has been described such that the total of four electromagnetic actuators 13 are arranged in both the front wheels (front right wheel and front left wheel) and the rear wheels (rear right wheel and rear left wheel). However, the present invention is not limited to this specific embodiment. For example, the total of two electromagnetic actuators 13 may be arranged in either one of the front wheels and the rear wheels.

Further, the electrically powered suspension system 11 according to the embodiment has been described such that the drive control unit 49 may independently control driving of the plurality of electromagnetic actuators 13.

To be more specific, the drive control unit 49 may independently control driving of the electromagnetic actuators 13 respectively provided in the four wheels, separately for wheels.

Further, the drive control unit 49 may independently control driving of the electromagnetic actuators 13 respectively provided for the four wheels, separately for the front wheels and for the rear wheels, or separately for the left wheels and the right wheels.

Finally, in the description of the electrically powered suspension system 11 according to the present invention, the damping force calculation unit 45 has been described such that it "calculates the equivalent friction compensation force Fif in relation to the electromagnetic actuator 13 based on the amount of change in the stroke ΔSA and the information on the stroke direction acquired by the information acquisition unit 43, and corrects the target damping force based on the calculated equivalent friction compensation force Fif".

In the case where the drive control unit 49 functions as the damping force calculation unit 45, there may be apprehension that the drive control unit 49 configured "to calculate the equivalent friction compensation force Fif in relation to the electromagnetic actuator 13 based on the amount of change in the stroke ΔSA and the information on the stroke direction acquired by the information acquisition unit 43, and to correct the target driving force based on the calculated equivalent friction compensation force Fif" may not fall within the technical scope of the electrically powered suspension system 11 according to the present invention.

However, in consideration of the fact that "the drive control unit 49" according to the present invention is configured "to control driving of the electromagnetic actuator using a target driving force obtained based on the target damping force", it is obvious that the target damping force can be used as a synonym for the target driving force because the target driving force is uniquely determined based on the target damping force in light of the wording the "target driving force obtained based on the target damping force".

For this reason, "to correct the target driving force" and "to correct the target damping force" are used substantially interchangeably. In other words, although the wordings are simply different, "to correct the target driving force" and "to correct the target damping force" are substantially the same in meaning.

Therefore, the implementation of the drive control unit 49 configured "to calculate the equivalent friction compensation force Fif in relation to the electromagnetic actuator 13 based on the amount of change in the stroke ΔSA and the information on the stroke direction acquired by the information acquisition unit 43, and to correct the target driving force based on the calculated equivalent friction compensation force Fif" is of course fallen within the technical scope of the electrically powered suspension system 11 according to the present invention.

What is claimed is:

1. An electrically powered suspension system comprising:

an electromagnetic actuator disposed in parallel with a spring member installed between a vehicle body and a wheel of a vehicle and configured to generate a driving force related to vibration damping of the vehicle;

an information acquisition unit configured to acquire time-series information related to a stroke position of the electromagnetic actuator, information on a stroke velocity, and an amount of change in a stroke of the electromagnetic actuator and information on a stroke direction based on the time-series information related to the stroke position;

a damping force calculation unit configured to calculate a target damping force that is a target value of a damping operation of the electromagnetic actuator based on the information on the stroke velocity acquired by the information acquisition unit; and a drive control unit configured to control driving of the electromagnetic actuator using a target driving force obtained based on the target damping force calculated by the damping force calculation unit, wherein the damping force calculation unit calculates an equivalent friction compensation force in relation to the electromagnetic actuator based on the amount of change in the stroke and the information on the stroke direction acquired by the information acquisition unit, and corrects the target damping force based on the calculated equivalent friction compensation force, the equivalent friction compensation force having an elastic force component and a dynamic friction force component.

2. The electrically powered suspension system according to claim 1, wherein the damping force calculation unit operates:

to calculate the elastic force component by multiplying the amount of change in the stroke by a predetermined coefficient based on the amount of change in the stroke and the information on the stroke direction acquired by the information acquisition unit, and to calculate the equivalent friction compensation force based on the calculated elastic force component and the dynamic friction force component, and subsequently to correct the target damping force based on the calculated equivalent friction compensation force.

3. The electrically powered suspension system according to claim 1, wherein the elastic force component has a characteristic to increase and decrease in accordance with a change in the amount of change in the stroke if the amount of change in the stroke converges to a predetermined region including zero, and wherein the dynamic friction force component has a characteristic to take a predetermined value irrespective of a change in the amount of change in the stroke if the amount of change in the stroke is present in a region outside the predetermined region.

4. The electrically powered suspension system according to claim 1, wherein the information acquisition unit acquires information on a vehicle speed, and wherein the damping force calculation unit adjusts, when calculating the equivalent friction compensation force, the elastic force component based on the information on the vehicle speed acquired by the information acquisition unit, and then calculates the equivalent friction compensation force based on the adjusted elastic force component and the dynamic friction force component.

5. The electrically powered suspension system according to claim 1, wherein the information acquisition unit acquires steering information related to steering of the vehicle, and wherein the damping force calculation unit adjusts, when calculating the equivalent friction compensation force, the elastic force component based on the steering information acquired by the information acquisition unit, and then calculates the equivalent friction compensation force based on the adjusted elastic force component and the dynamic friction force component.

6. The electrically powered suspension system according to claim 1, wherein the information acquisition unit acquires traveling road surface information that is information on a road surface on which the vehicle is traveling, and wherein the damping force calculation unit adjusts, when calculating the equivalent friction compensation force, the elastic force component based on the traveling road surface information acquired by the information acquisition unit, and then calculates the equivalent friction compensation force based on the adjusted elastic force component and the dynamic friction force component.

7. The electrically powered suspension system according to claim 1, wherein the damping force calculation unit determines, when calculating the equivalent friction compensation force, information on an operational condition of the electromagnetic actuator as to whether the electromagnetic actuator extends or contracts based on the information on the stroke direction acquired by the information acquisition unit, and then sets the equivalent friction compensation force based on the determined information on the operational condition of the electromagnetic actuator such that an equivalent friction compensation force corresponding to an extension operation of the electromagnetic actuator and an equivalent friction compensation force corresponding to a contraction operation of the electromagnetic actuator have different characteristics to each other.

* * * * *